United States Patent [19]
Prunotto et al.

[11] Patent Number: 5,642,291
[45] Date of Patent: Jun. 24, 1997

[54] SYSTEM FOR CREATING COMMAND AND CONTROL SIGNALS FOR A COMPLETE OPERATING CYCLE OF A ROBOT MANIPULATOR DEVICE OF A SHEET METAL BENDING INSTALLATION BY SIMULATING THE OPERATING ENVIRONMENT

[75] Inventors: Gianpaolo Prunotto; Marco Prada, both of Turin, Italy

[73] Assignee: Amada Company, Limited of Japan, Kanagawa, Japan

[21] Appl. No.: 578,383

[22] Filed: Dec. 26, 1995

Related U.S. Application Data

[63] Continuation of Ser. No. 347,209, Nov. 21, 1994, abandoned, which is a continuation of Ser. No. 721,653, filed as PCT/JP90/01672, published as WO91/10180, Jul. 11, 1991, abandoned.

[30] Foreign Application Priority Data

Dec. 22, 1989 [IT] Italy ........................ 68174/89

[51] Int. Cl.[6] .................. G05B 19/4059; G05B 19/4061
[52] U.S. Cl. .................... 364/472.01; 364/188; 364/191; 364/468.24; 364/476.01; 72/422
[58] Field of Search ........................ 364/188, 191, 364/468.01, 468.24, 472.01, 476.01; 72/7, 8, 22, 23, 422

[56] References Cited

U.S. PATENT DOCUMENTS

| 3,874,205 | 4/1975 | Roch et al. ........................ 72/8 |
|---|---|---|
| 4,366,689 | 1/1983 | Yajima ........................ 72/7 |
| 4,378,592 | 3/1983 | Heiberger et al. ........................ 364/476 |
| 4,510,570 | 4/1985 | Yonekura ........................ 364/476 |
| 4,594,870 | 6/1986 | Koyama et al. ........................ 72/24 |
| 4,633,720 | 1/1987 | Dybel et al. ........................ 364/476 |
| 4,682,280 | 7/1987 | Schneider ........................ 364/191 |
| 4,700,308 | 10/1987 | Jones ........................ 364/468 |
| 4,845,992 | 7/1989 | Dean ........................ 72/7 |
| 4,998,050 | 3/1991 | Nishiyama et al. ........................ 364/191 |
| 5,005,394 | 4/1991 | Sartorio et al. ........................ 364/476 |
| 5,287,433 | 2/1994 | Prunotto et al. ........................ 395/99 |

FOREIGN PATENT DOCUMENTS

| 0047056 | 3/1982 | European Pat. Off. . |
|---|---|---|
| 0346839 | 12/1989 | European Pat. Off. . |
| 2451062 | 10/1980 | France . |
| 2630250 | 1/1978 | Germany . |
| 2811905 | 3/1979 | Germany . |
| 67224A88 | 3/1988 | Italy . |
| 2211002 | 6/1989 | United Kingdom . |
| 2217244 | 10/1989 | United Kingdom . |

Primary Examiner—Paul P. Gordon
Attorney, Agent, or Firm—Greenblum & Bernstein P.L.C.

[57] ABSTRACT

A system for the creation of commands and control signals for a complete operating cycle of a robot manipulator device of a sheet metal bending installation by simulating the operating environment, in which various parts of the sheet metal bending installation are presented to the user on a video display in a simplified form and on a reduced scale. The video display and a keyboard are connected to a central processor unit and permit the creation of a complete sequence of signals usable for controlling the operation of the bending installation, and permits the presentation of the simulation of the movement of the parts of the installation on the video.

29 Claims, 20 Drawing Sheets

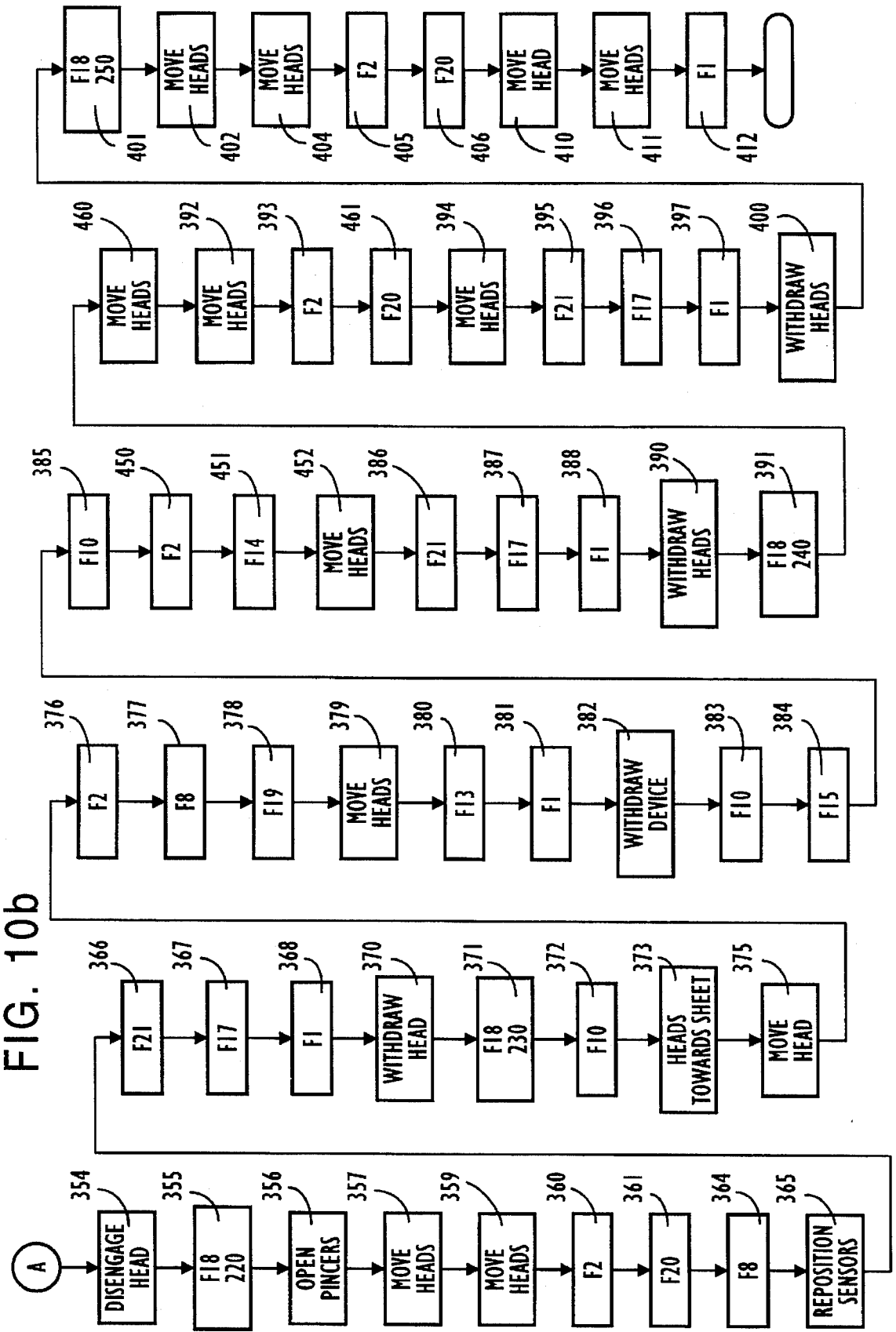

SYSTEM FOR CREATING COMMAND AND CONTROL SIGNALS FOR A COMPLETE OPERATING CYCLE OF A ROBOT MANIPULATOR DEVICE OF A SHEET METAL BENDING INSTALLATION BY SIMULATING THE OPERATING ENVIRONMENT

This application is a continuation, of application Ser. No. 08/347,209, filed Nov. 21, 1994, now abandoned, which is a continuation of application Ser. No. 07/721,653, filed as PCT/JP90/01672, Dec. 21, 1990, published as WO91/10180, Jul. 11, 1991, now abandoned.

TECHNICAL FIELD

The present invention relates to a system for creating command and control signals for a complete operating cycle of a robot manipulator device of a sheet metal bending installation by simulating the operating environment.

BACKGROUND ART

The following system is advantageously applied to the simulation of the operating environment of a manipulator device of a sheet metal bending installation, for example of the type described in Italian Patent Application No. 67224-A/88 filed 15 Mar., 1988 and the contents of which are incorporated herein by reference. In this Patent application there is described a sheet metal bending installation which includes a pair of motor driven manipulator heads which are translatable within a manipulation space and are rotatable about a common axis which is parallel to a linear bending zone defined by two dies of a press. The manipulator heads are adapted to grip the opposite edges of a metal sheet and to position this metal sheet between the dies of the press in such a way as to allow the predetermined bending of the metal sheet. This manipulator device further has a pivoted arm which is provided with a plurality of auxiliary pincers which can grip an edge of the metal sheet to invert it. The manipulator device and the press are controlled by an electronic control unit which imparts sequential instructions thereto on the basis of memorized instructions defining successive bending cycles.

The instructions for the various stages of the bending cycle can be obtained according to the so called "self-learning" procedure on the basis of which an operator physically moves the machine through the sequence of movements which are required to perform the bending cycle and, when each movement has been effected, inserts into the command unit the parameters relating to this movement, or else according to the system described in Italian Patent Application filed 18 Dec. 1989 and entitled "A System for the Automatic Creation of Control Signals for the Operating Cycles of a Robot Manipulator Device of a Sheet Metal Bending Installation" the contents of which are incorporated here by reference. This system is adapted automatically to create control signals for the operating cycles of a robot manipulator device of a sheet metal bending installation, and comprises a portable keyboard of small dimensions provided with keys to be selected by an operator and called "function keys" each of which is operable to define a complete sequence of control signals for a specific phase of the cycle. The keyboard further includes other keys which are operable to move individual parts of the bending installation.

To derive a sequence of control signals for a complete bending cycle according to the system described in the above patent application entitled "A System for the Automatic Creation of Control Signals for the Operating Cycles of a Robot Manipulator Device of a Sheet Metal Bending Installation", an operator must spend many hours in proximity to the bending installation in that the teaching cycle must in practice be performed on the installation, and the controls to move the various parts of the bending installation, conveniently by means of the small keyboard, are located near the installation to allow the necessary visibility for the operator.

SUMMARY OF THE INVENTION

It is therefore the object of the present invention to provide a system which permits a sequence of control signals for a sheet metal bending installation to be derived in a short time and without the direct use of the machine so as to make it possible to define the working cycle independently of the presence of the machine, while nevertheless obtaining a sequence of control signals which guarantee the correct and complete execution of the various operating phases of the bending cycle.

The object is achieved by the present invention which relates to a system for the creation of control signals for a complete operating cycle of a robot manipulator device of a sheet metal bending installation, characterized in that it comprises communication means connected to a central processing unit to produce an operating simulation of the device and the creation of the control signals.

BRIEF DESCRIPTION OF DRAWINGS

FIG. 10*a* and 10*b* are a flow chart of the phases of the operating cycle created to form the profile shown in FIG. 7.

DETAILED DESCRIPTION OF THE PREFERRED EMBODIMENT

A preferred embodiment of the invention will now be described, applied to a sequence of control signals for a robot manipulator device of a sheet metal bending installation the structure of which is shown in FIGS. from 1 to 6.

Figure 1:
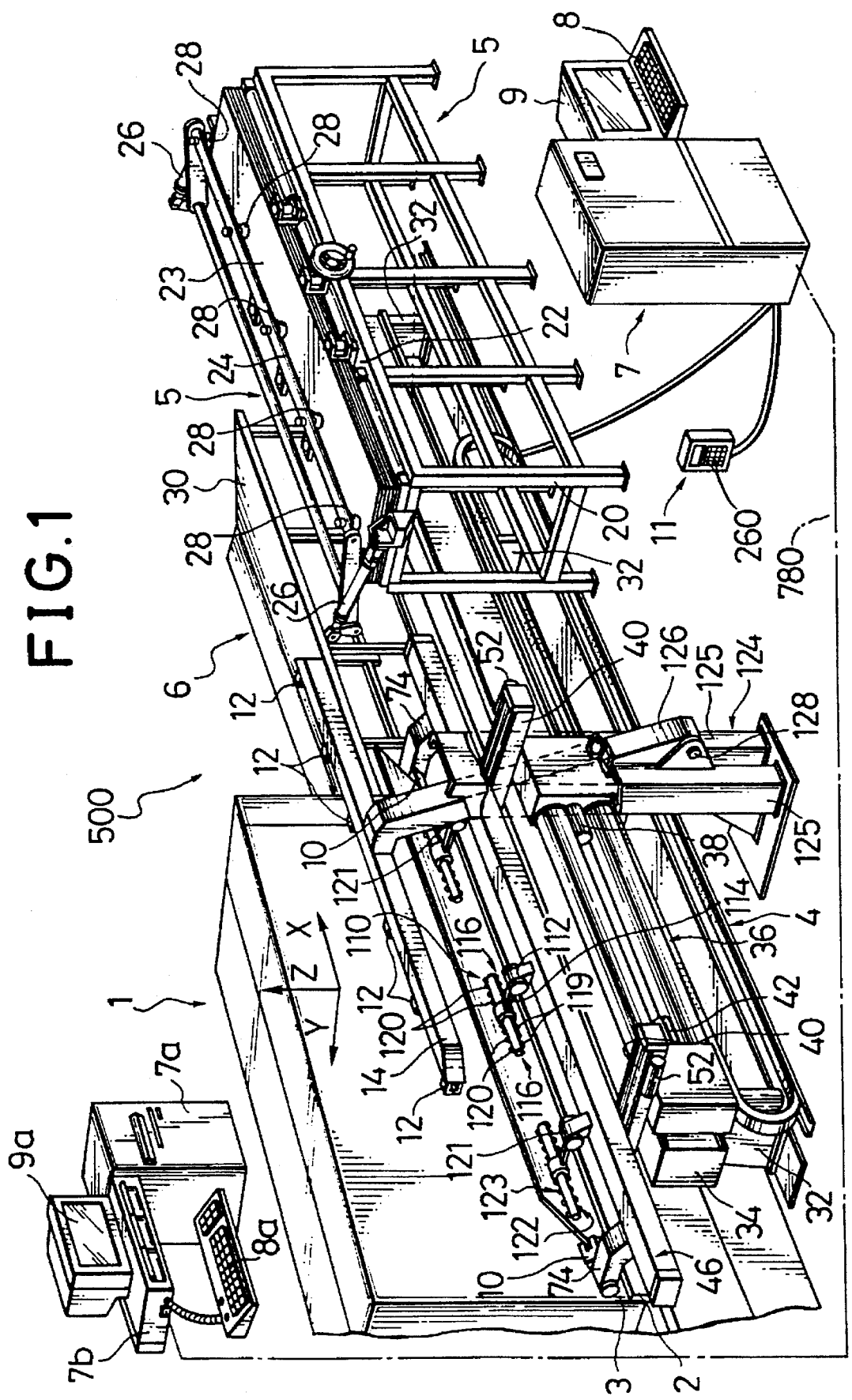
FIG. 1 is a perspective view of a sheet metal bending installation comprising a bending press, a manipulator device, a loading device and a workpiece discharge table controlled by an electronic control unit to which the control signal creation system according to the present Invention is fitted.

In FIG. 1, in particular, there is illustrated a sheet metal bending installation 500 including a bending press 1 having a die 2 and a die 3. In front of the press 1 there is a manipulator device 4. On one side of the press 1 there is a magazine with a loader device 5 and a discharge table 6.

A microprocessor-controlled electronic control unit 7 controls the operation of the manipulator device 4 and the press 1. The electronic unit 7 is provided with an alphanumeric keyboard 8, a video 9, and a small portable keyboard 11 (hand box) utilized in a manner which will be explained in more detail hereinbelow.

The electronic unit 7 can further be connected to a second microprocessor electronic unit 7a forming part of the system constituting the subject of the present invention, which is normally disposed in a different location away from the location where the bending installation 500 is housed. The electric unit 7a is further connected to a video 9a and to a keyboard 8a conveniently by means of an additional microprocessor electronic unit 7b. Finally, it is important to note that the system forming the subject of the present invention is operable even if no connection is established between the electronic unit 7 and the unit 7a.

The loader device 5 comprises a bed 20 with an upper plane 22 on which rests a stack of flat, rectangular metal sheets 23 to be subjected to bending.

A movable beam 24, controlled by actuators 26, carries a series of suckers 28 for lifting the sheets 23 in succession and transferring them to a horizontal position in the space between the loader device S and the discharge table 6, which table 6 is constituted by a simple bed with an inclined support plane 30. The plane 30 is intended, as will be seen, to receive the shaped sheets from the manipulator device 4.

This manipulator device 4 includes a support base having feet 32 which carry a guide 34. The guide 24 extends parallel to the working plane of the press 1 along the whole of the lower part of the press 1, and into the space between the loader device 5 and the discharge table 6.

On the guide 34 there slides an elongate carriage generally indicated 36, which is slidable parallel to the die 2, that is, alone the X-axis. The carriage 36 is movable alone the guide 34 from a position in which it faces the press 1 to a position in which it is located between the loading device 5 and the discharge table These movements of the carriage 36 alone the guide 34 are controlled by a servo motor 38 which is preferably numerically controlled. The servo motor 38 drives a toothed wheel (not shown) which cooperates with a rack (not shown) which extends along the guide 34.

The carriage 36 supports, adjacent its ends, a pair of longitudinal guides 40 which extend parallel to the Y-axis. Each of these guides 40 is vertically slidable on the carriage 36 parallel to the Z-axis. Their movement along the Z-axis is controlled by a numerically controlled servo motor 42 carried by the carriage 36. Each guide 40 is supported by a vertical rod 44 slidable in the carriage 36. The servo motor 42 drives in unison respective toothed wheels (not shown) meshing with respective racks (not shown) supported by the rods 44.

The guide 40 support a robust beam 46 which extends parallel to the bending zone defined by the dies 2 and 3.

The beam 46 is supported on the guides 40 by respective slides 48 movable parallel to the Y-axis.

Each slide 48 carries a vertical pin 50 about which the beam 46 can oscillate horizontally through a small angle.

The movements of each slide 48 are controlled by a respective, numerically controlled servo motor 52 carried by the respective guide 40. Each servo motor 52 drives a respective worm screw (not shown) which extends within the guide 40 and which cooperates with a nut (not shown) fixed to the respective slide 48.

The movements of the beam 46 along the Y-axis, during manipulation of the workpieces, are controlled by the two servo motors 52 acting in unison in such a way that the beam 46 moves parallel to itself.

In order to effect a precise positioning of the sheet 23, the press 1 provided with a pair of alignment sensors 66 which are mounted on supports slidable along the Y-axis, and which are disposed close to the die 3. The sensors 66 are provided with a rod 67 which is movable parallel to the Y-axis and terminates with an end 68 adapted to detect contact with an edge of the metal sheet 23.

The side of the beam 46 facing the press 1 carries two motor driven slides (not shown) slidable in unison and in opposite directions along the beam 46 itself; each slide carries a robust hollow projecting arm 74 extending towards the bending press 1. Each of these arms 74 carries at its free end a respective manipulator head 10 the axis of rotation of which is common to the two heads. As will be understood, the movements of the two slides serve to cause engagement of the manipulator heads 10 with the edges of the sheet 23 and their disengagement therefrom.

The rotations, in unison, of the two heads 10 about their axes, both for changing the attitude and the position of the manipulator pincers carried by the heads 10, are controlled by a numerically controlled servo motor.

Figure 3:
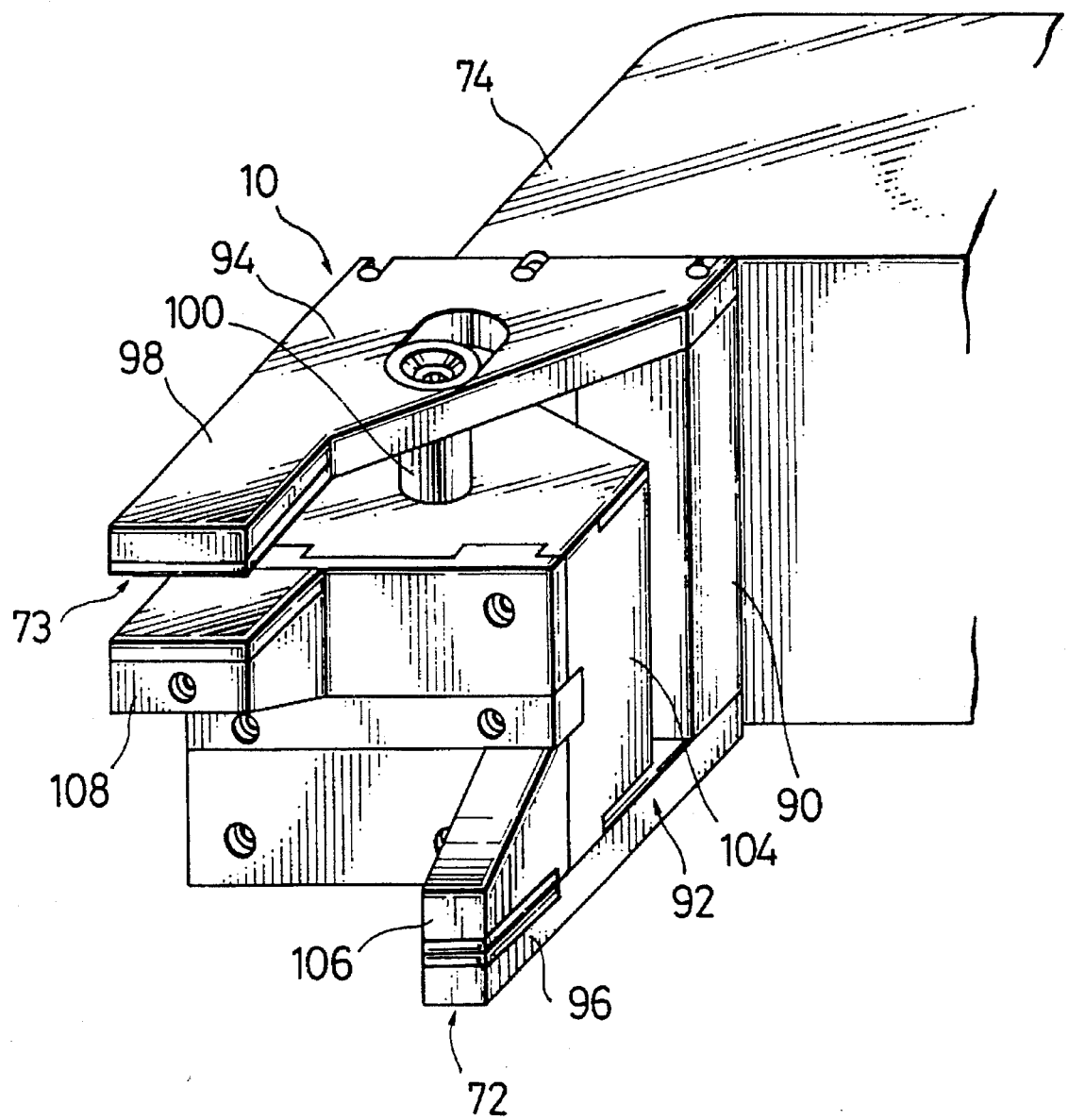
FIG. 3 is a perspective view of a manipulator head of the manipulator device illustrated in FIG. 1.

Referring now to FIG. 3, the preferred structure of the two manipulator heads 10 will be described.

The head 10 comprises a square flange 90 which supports two projecting opposite cheeks 92 and 94. The free ends of these cheeks 92 and 94 are shaped in such a way as to constituted respective outer fixed jaws 96 and 98, of a manipulator pincer 72 and a manipulator pincer 73 respectively.

Centrally between the two cheeks 92 and 94 extends a rod 100 to which is fixed a double piston. The piston is surrounded by a movable body 104 constituting a cylinder for the piston. The body 104 is movable along the rod 100.

To the body 104 are fixed two movable Jaws 106 and 108, one of which forms part of the manipulator pincer 72 and the other of which forms part of the manipulator pincer 73. The disposition of the pincer 72 and the pincer 73 is that when the pincer 73 is open, the pincer 72 is closed and vice versa.

As can be seen, the two diametrically opposite manipulator pincers 72 and 73 are situated eccentrically with respect to the axis of rotation of the head 10. The fixed jaws 96 and 98 are situated on the outline of the head, while the movable Jaws 106 and 108 are slidable within the outline of the head 10. This disposition is the most favorable for achieving a manipulator head 10 of very small dimensions and permits the maximum approach of the manipulator pincers 72 and 73 to the bending zone.

Both the fixed Jaws 96 and 98 and the movable jaws 106 and 108 are replaceable in simple and rapid manner with jaws of different dimensions, especially in width. While the Jaws 98 and 108 shown may be of minimum width, the maximum width of the Jaws can be equal to the width of the head.

Figure 4:
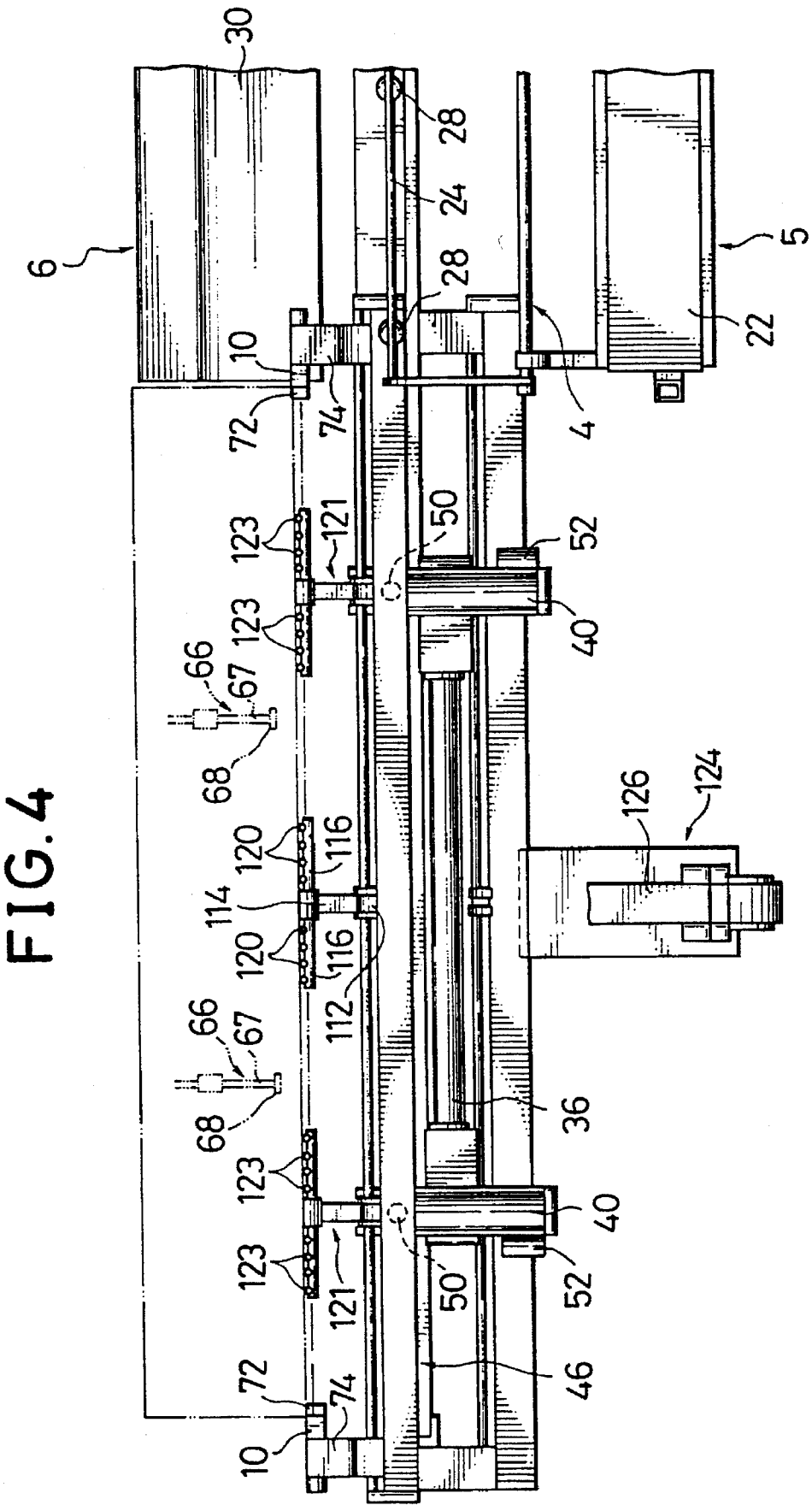
FIG. 4 is a top plan view of the manipulator device.

Referring now to FIGS. 1 and 4, an auxiliary support for the manipulation of very long sheet metal workpieces, with which the manipulator device 4 is provided, will now be described.

When a sheet of this type is supported at its ends by the pincers of the manipulator head 10 before bending, or when only small bends have been formed, it is susceptible of sagging and it is therefore necessary to support it in at least one intermediate zone.

For this purpose, along the beam 46 there is mounted at least one principal auxiliary support device generally indicated 110. This device 110 comprises a carriage 112 which is manually movable along the beam 46 and lockable on this in a desired position. If only one auxiliary device 110 is provided, this position is the center position illustrated in FIG. 1.

A hollow projecting auxiliary support arm 114 is articulated on the carriage 112 about a horizontal axis parallel to the X-direction. When the device 110 is in operation, an actuator (not shown) carried by the carriage 112 maintains the arm 114 in a raised position. At its free end the arm 114 carries an auxiliary support head 116 having two suction tubes.

The head 116 is rotatable about an axis which coincides with the axis of rotation of the manipulator heads 10 and the auxiliary head 116 turns in unison with the manipulator heads 10.

The head 116 carries two series of diagonally opposite lower suckers 119 and upper suckers 120 having abutment surfaces which correspond with the gripping planes of the manipulator heads 10. The suckers 120 are connected to a vacuum source (not shown) in a known manner.

As will be understood, the suckers 119 or 120 are able to support a sheet at its intermediate zone independently of the attitude of the surface of the sheet which they engage.

In the case of a sheet of great width the auxiliary support device 110 is utilized when forming the first bends.

When the auxiliary support is not needed the actuator is controlled in such a way as to cause the arm 114 to descend to an inactive position.

The auxiliary support 110 is flanked by two secondary support devices 121 which are disposed on opposite sides of the dive 110 and have a similar structure. The devices 121, among other things have a plurality of upper suckers 123 and lower suckers 122 the function of which is analogous to that of the suckers 119 and 120.

Figure 2:
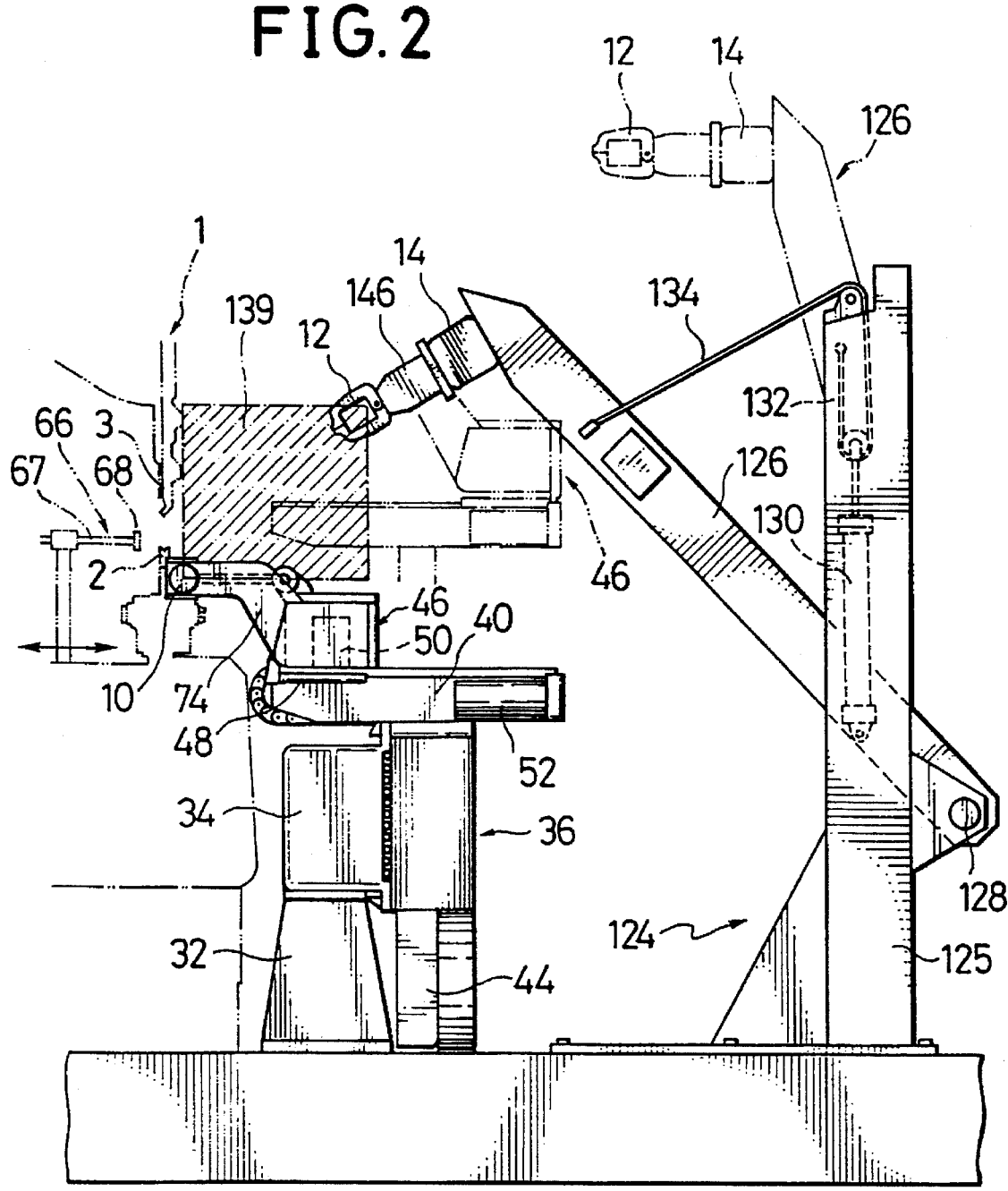
FIG. 2 is a side elevation of the manipulator device illustrated in FIG. 1, with the various parts shown in different positions.
Figure 6:
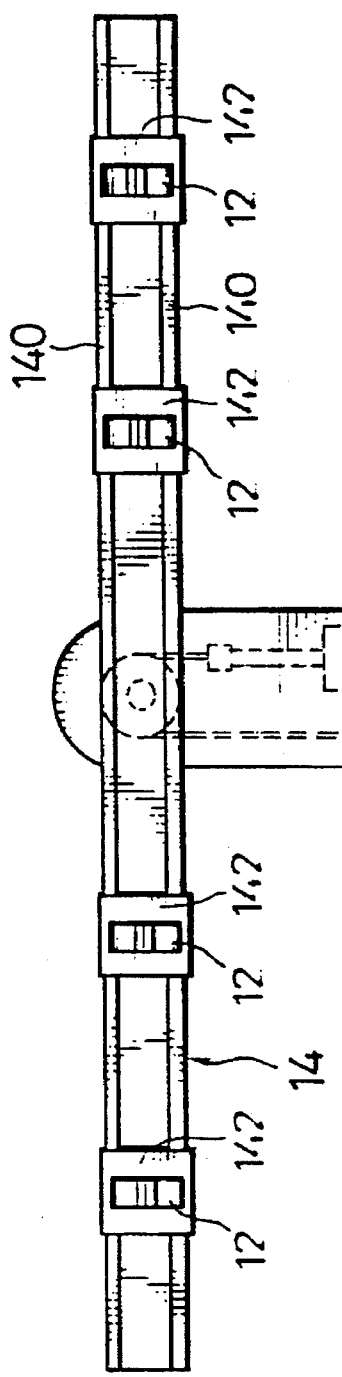
FIG. 6 is a partial front view of the support structure of the auxiliary pincers illustrated in FIG. 5.

As illustrated in FIGS. 1, 2 and 6, a robust supporting column 124 is fixed to the floor on the side of the base 32 opposite that facing the press 1. The column includes two facing box-like uprights 125. Between the uprights 125 there is located a robust oscillating box-like arm 126 supported by the uprights 125 by means of a pin 128.

In one of the uprights 125 there is incorporated a vertical actuator 130 (FIG. 2.) Associated with the arm of the actuator 130 there is a pulley block 132 for a chain 134 anchored to the arm 126.

Finally, the arm 126 carries a beam 14 which carries spaced pincers 12 at its front and is mounted so as to be rotatable through 180° at the free upper end of the oscillating arm 126.

Within the arm 126 there is incorporated a double acting longitudinal pneumatic actuator 136 which controls the rotation of the beam 14 about the support axis on the arm 126 by means of a chain transmission 138, (FIG. 6).

The structure comprising the arm 126, the beam 14 and the pincers 12 can be made to oscillate, by means of the actuator 130, between the inclined position illustrated in solid outline in FIG. 2 and the vertical raised position illustrated in broken outline in FIG. 2.

In FIG. 2, the beam 46 and one of the support arms 74 of the manipulator heads 10 are shown in solid outline in the lowermost position of greatest advance towards the press 1, and in broken outline In the uppermost and most retracted position. The reference numeral 139 indicates the manipulation space within which the common axis of rotation of the manipulator head 10 and the auxiliary support head 116 can move.

Figure 5:
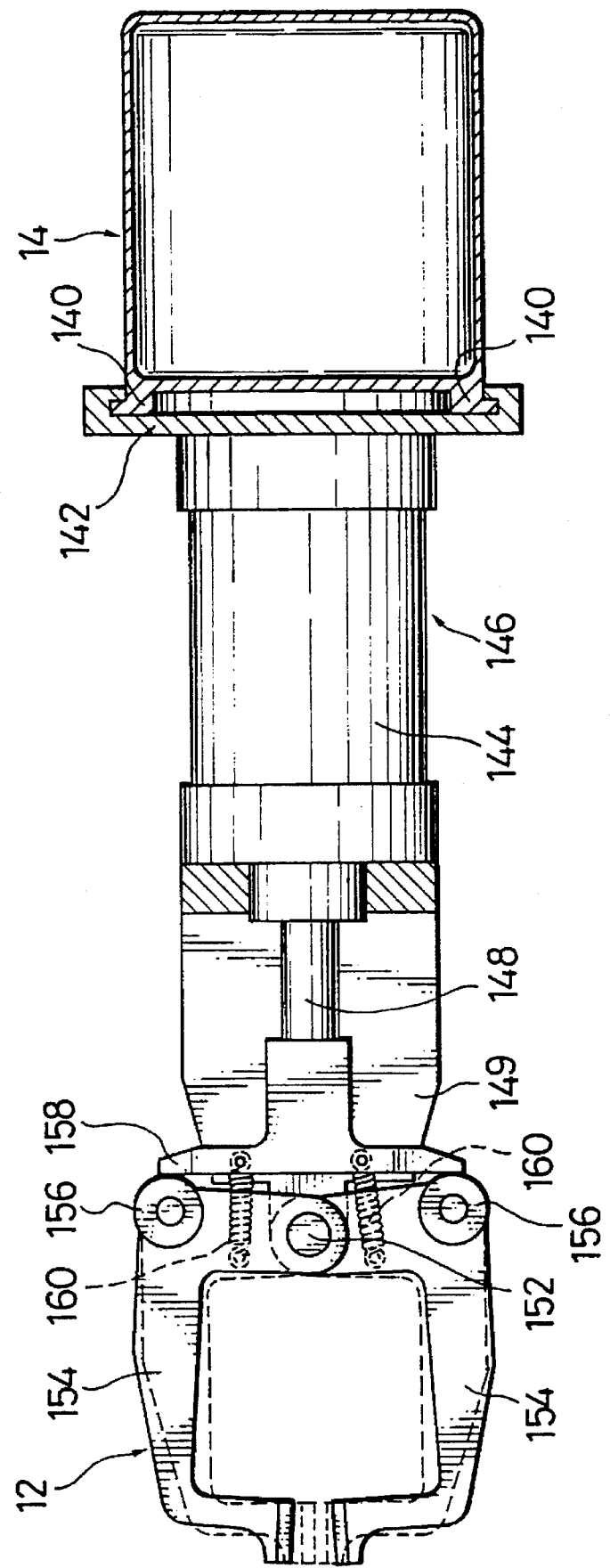
FIG. 5 is a partially sectional side view of an auxiliary pincers of the manipulator device of FIG. 1 and of its supporting beam.

Referring to FIGS. 5 and 6, the beam 14 has a pair of longitudinal guides 140 along which are mounted four slides 142 which are manually displaceable and lockable on the guides themselves in the positions considered most convenient.

As illustrated in FIG. 5, each slide 142 is fixed to the cylinder 144 of a double acting pneumatic actuator 146. The arm 148 of the actuator 146 projects forwardly with respect to the beam 14.

The cylinder 144 carries a bracket 149 which surrounds the arm 148 and carries a transverse pin 152. The pin 152 constitutes a central fulcrum for the two symmetrical jaws 154 of the auxiliary pincer 12.

Each Jaw 154 is provided with a pair of lateral rollers 156. The arm 148 is provided with a front plate 158 with which the rollers 156 cooperate.

Between the plates 158 and each jaw 154 are interposed tension coil springs 160 hooked into respective cavities or seats of the plate and the jaw.

The arrangement is such that when the actuator 146 and the plate 158 are retracted, the springs 160 maintain the pincer 12 open with the jaws 154 separated, as illustrated in solid outline in FIG. 5.

When pressure is introduced into the actuator 146, the arm 148 advances, and the plate 158 presses the rollers 156 forcing the jaws 154 to close. This situation is illustrated in broken outline in FIG. 5.

Figure 12:
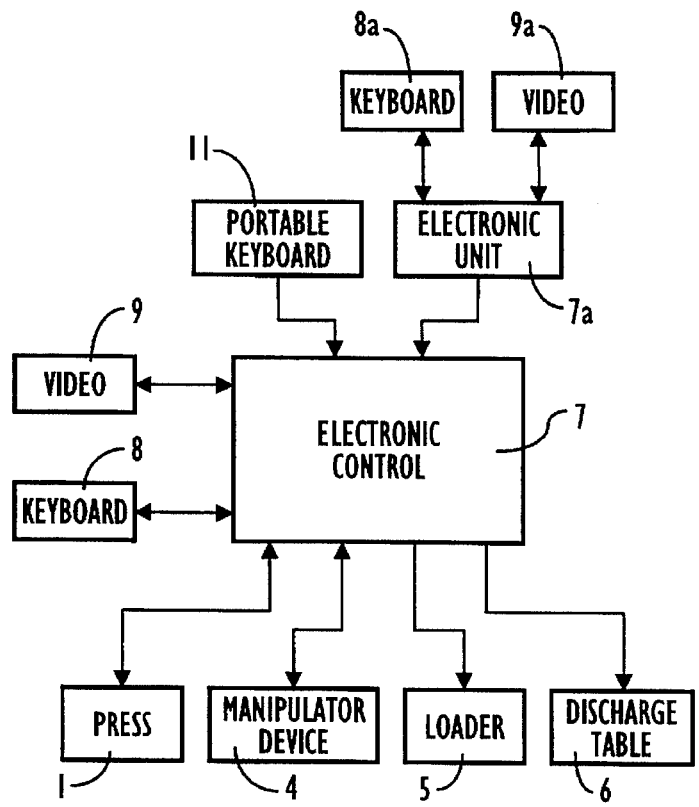
FIG. 12 schematically illustrates the interconnections between the electronic control unit shown in FIG. 1 and the various devices connected to it.

In FIG. 12 the interconnections between the electronic control unit 7 and the various devices connected to it and controlled by it are shown schematically. In particular, the electronic unit 7 controls the press 1, the manipulator device 4, the loader device 5, and the discharge table 6 (if automated with a device for removing the finished pieces from the plane 30.) The electronic unit 7 is moreover provided with a portable keyboard 11 and a keyboard 8 utilized to create a sequence of control signal in a manner which will be explained clearly hereinbelow. The electronic unit 7 is finally provided with a video 9 for displaying the sequences of control signals, and can be connected to the electronic unit 7a provided with the video 9a and the keyboard 8a which are utilized both for creating and for memorizing sequences of control signals for the bending installation 500, using the system of the present invention.

Figure 7:
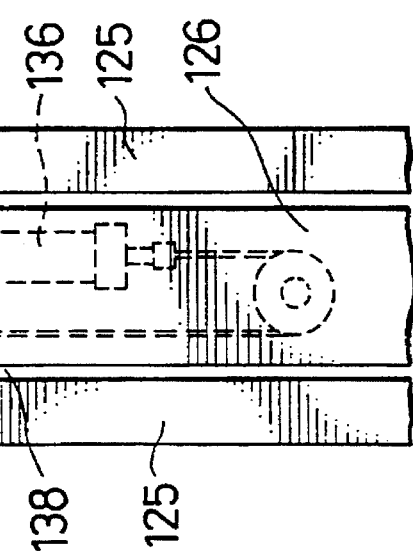
FIG. 7 is a profile of a shaped metal formed by the bending installation shown in FIG. 1.
Figure 7:
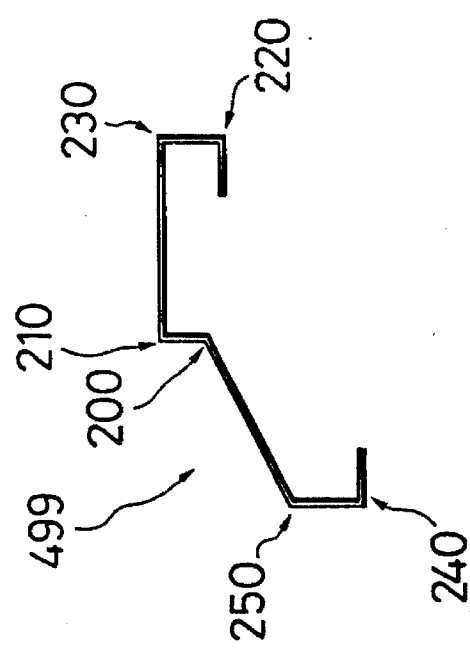

In FIG. 7 there is shown the profile of a shaped workpiece 499 having six parallel bend lines 200,210, 220, 230,240, and 250 obtained from a flat metal sheet 23 of rectangular form by a bending cycle which will be described in detail with reference to FIGS. 8a–8p.

Figure 8A:
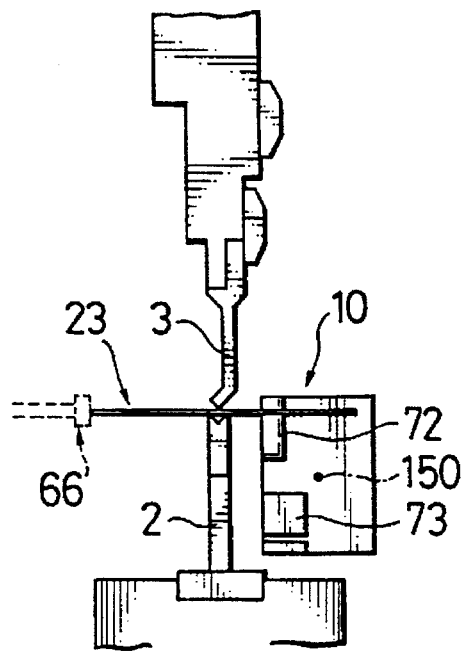
FIG. 8*a*, 8*b*, 8*c*, 8*d*, 8*e*, 8*f*, 8*g*, 8*h*, 8*i*, 8*j*, 8*k*, 8*l*, 8*m*, 8*n*, 8*o*, and 8*p* schematically illustrates the successive bending stages necessary to obtain the profile shown in FIG. 7.
Figure 8B:
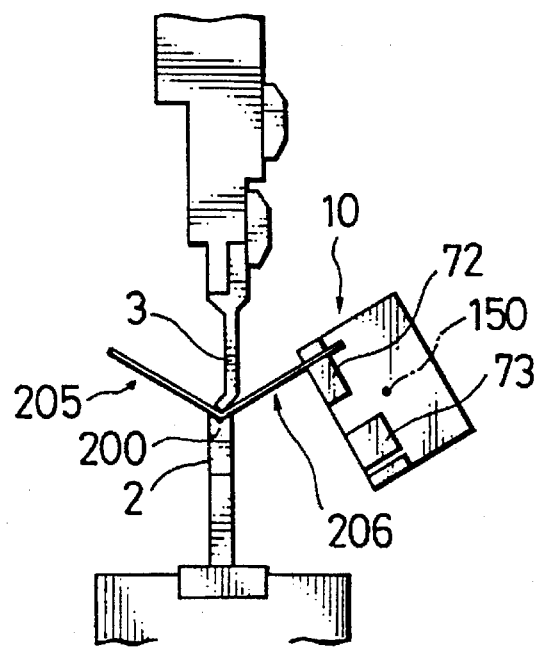
Figure 8C:
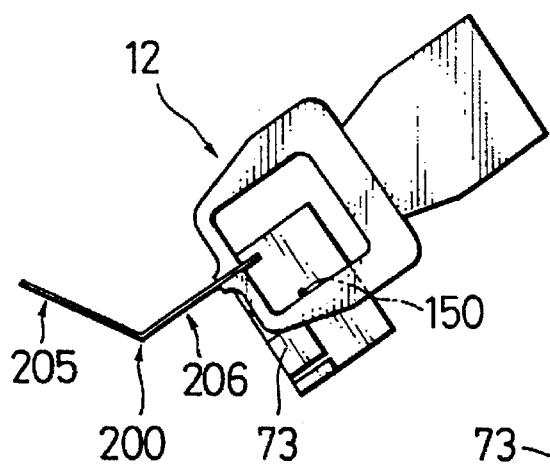
Figure 8D:
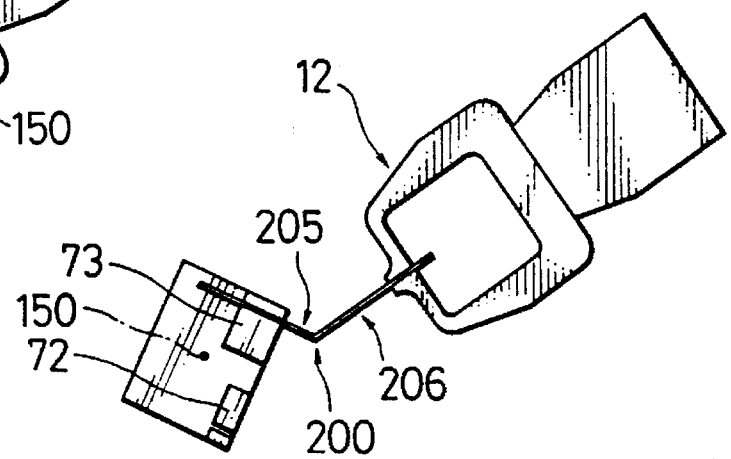
Figure 8E:
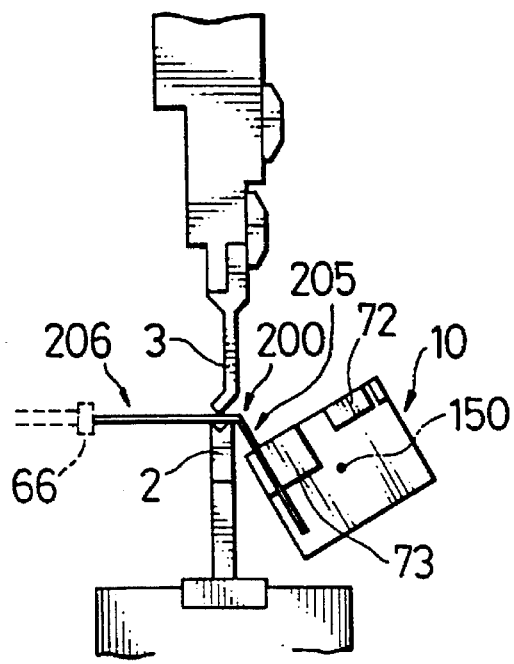
Figure 8F:
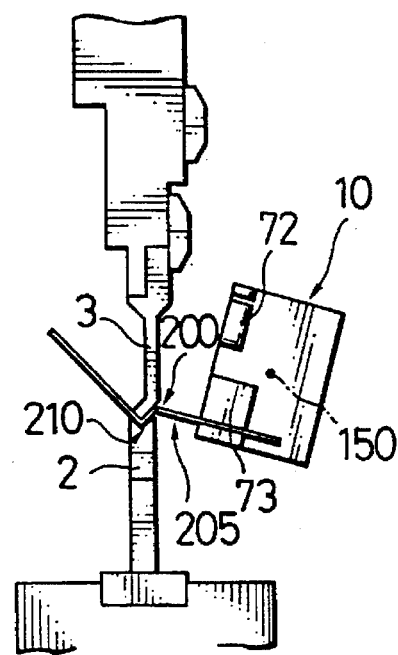
Figure 8G:
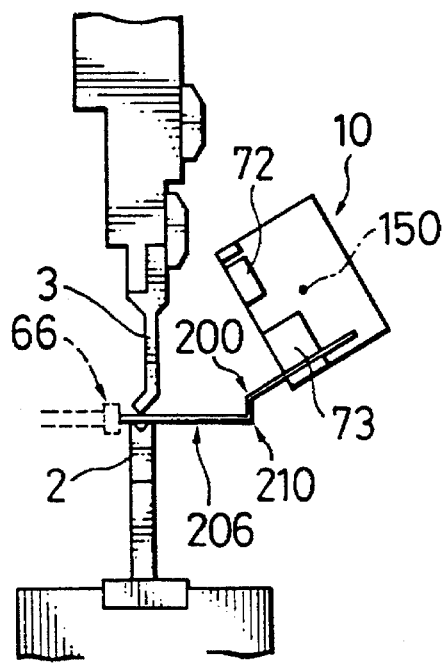
Figure 8H:
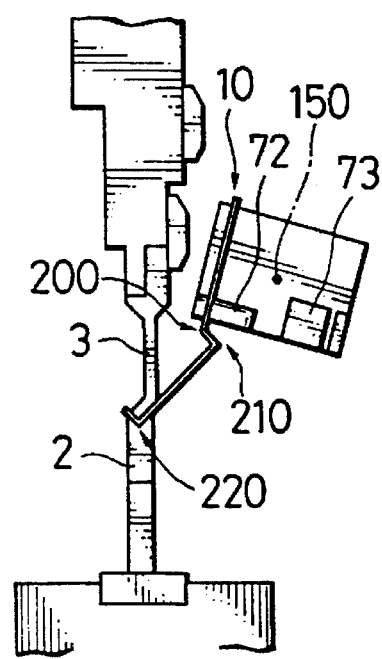
Figure 8I:
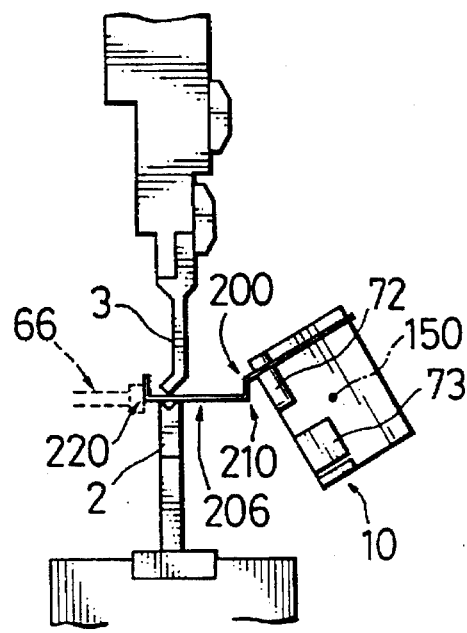
Figure 8J:
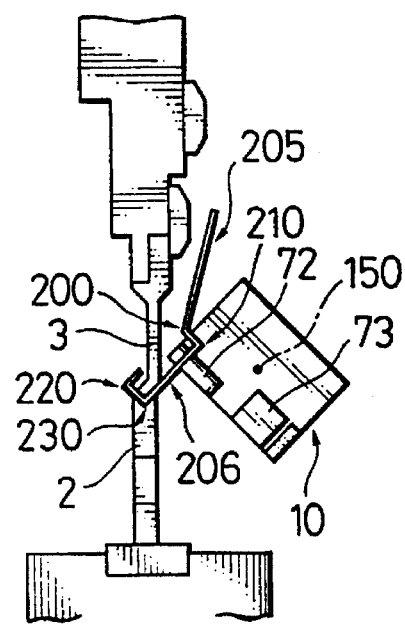
Figure 8K:
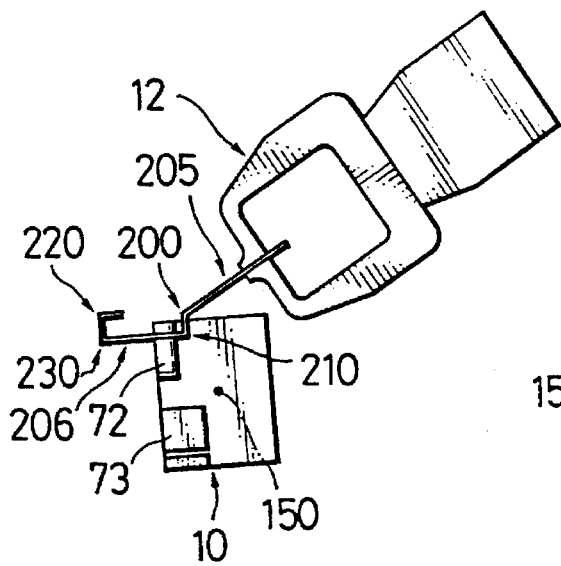
Figure 8L:
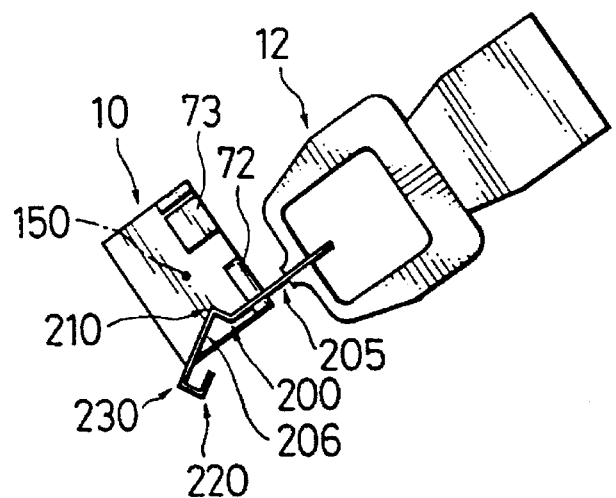
Figure 8M:
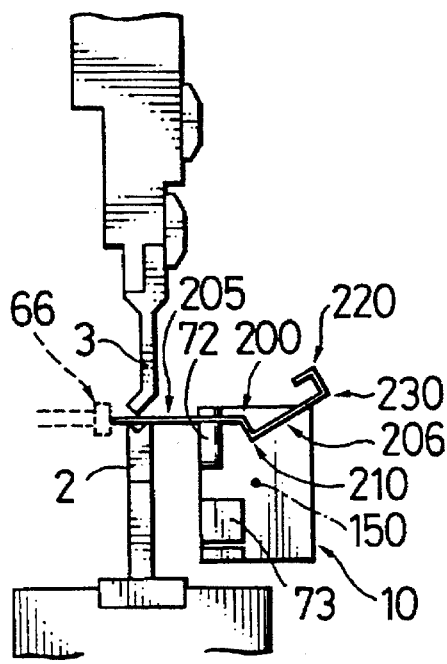
Figure 8N:
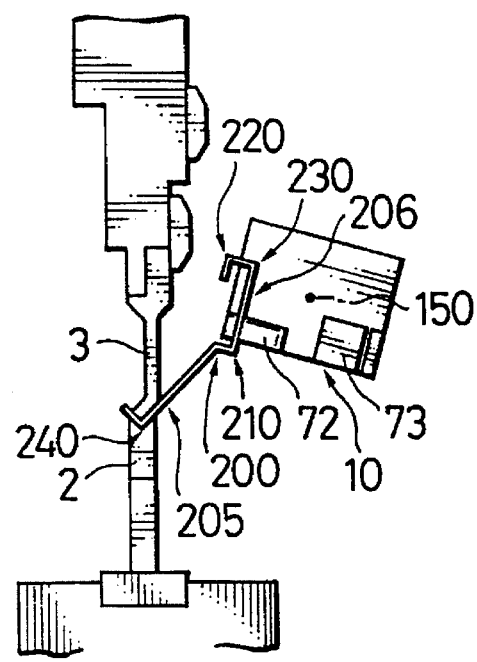
Figure 8O:
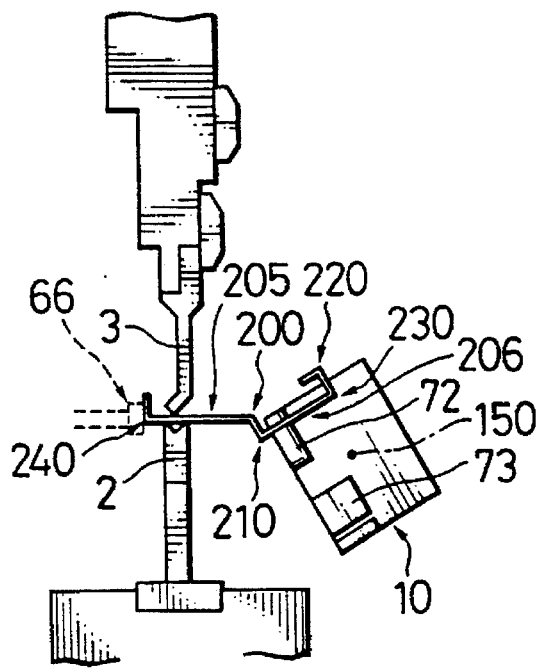
Figure 8P:
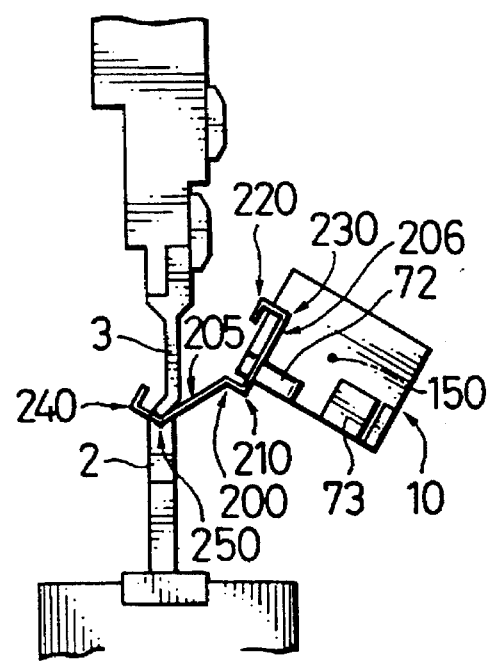

In these FIGS. 8a–8p, the bending press 1 is schematically illustrated as comprising the lower die 2 and the upper die 3. In the illustrated example, the die 2 is fixed, while the die 3 is reciprocally movable in a vertical working plane. The die 2 has a hollow profile with a dihedral angle and the die 3 has a complementary convex profile with a dihedral angle. In the example illustrated, the dihedral angle is 90° and is symmetrical with respect to the working plane.

As previously mentioned, the manipulator device 4 comprises a pair of manipulator heads 10 which carry respective manipulator pincers 72 and 73. These pincers 72 and 73 are illustrated in FIGS. 8a–8p in a different position from that illustrated in FIG. 3; in particular, the pincers 72 and 73 have gripper openings on the same side of the head 10 and are movable in unison and in opposition (closure and opening) with respect to each other.

Each manipulator head 10 is mounted rotatably about an axis 150 common to the two heads.

With reference to FIG. 8a, the metal sheet 28, after it has been released by the loader device 5, is taken by the manipulator device 4, and in particular is gripped by the manipulator pincers 72 thereof, which carries it between the dies 2 and 3 of the press 1, which are still in the open position. The heads 10 are caused to rise simultaneously until they carry the sheet 23 onto the die 2 with the rear edge of the sheet 23 coming into contact with the ends 88 of the sensors 88; in this way, the sensors 66 emit a signal which indicates that the sheet 23 has reached, within the interior of the press 1, the predetermined position for the formation of the first bend 200 at the predetermined height. The die 2 and the die 3 are then caused to advance towards each other in such a way as to retain the sheet 23 without bending it.

In the subsequent phase the two manipulator pincers 72 open, and the two heads 10 move apart disengaging the sheet 23.

The following phase is the bending phase in which the die 3 is further lowered and forms the bend 200 in the sheet 28.

At the end of this bending operation, as can be seen in FIG. 8b, there are formed two leaves 205 and 206 in the sheet 23, which form between them an angle of about 100°.

In the subsequent phase, also illustrated in FIG. 8b, while the sheet 23 is still clamped between the two dies 2 and 3, the heads 10 rise and rotate assuming an attitude such that the pincers 72 lie in a gripping plane which coincides with the plane of the leaf 206 facing the pincers 72 and can regrip the sheet 23.

After the sheet 23 has been gripped again, the die 3 rises and the heads 10 move away from the press 1 until they reach the region of the auxiliary pincers 12 as schematically shown in FIG. 8c.

The auxiliary pincers 12 lie in an inclined gripping plane. To permit the gripping of the sheet 23 by the auxiliary pincers 12, in their rising motion moving away from the press 1 the heads 10 have been caused to rotate in such a way as to carry the leaf 206 of the sheet 23 into correspondence with this plane. As illustrated in FIG. 8c, the auxiliary pincers 12 grip the longitudinal edge of the sheet 23.

In the subsequent phase, the manipulator pincers 72 disengage from the lateral edges of the sheet 23 and move away.

In the following phase (FIG. 8d), the manipulator heads 10 rotate through more than 180° about their axis 150 and the manipulator pincers 73 grip the edge of the leaf 205 of the sheet 23, while the auxiliary pincers 12 subsequently open and move away with the raising of the arm 126.

In the next successive phase, the two heads 10 are again lowered, turning about the axis 150, and advanced to bring the leaf 206 of the sheet 23 to rest on the edges of the die 2. As illustrated in FIG. 8e, the sheet 23 is rested on the die 2 in such a way that the rear edges of the leaf 206 are aligned with the ends 68 of the sensors 66 positioned along the Y axis at a height corresponding to the production of the second bend 210.

Subsequently the die 3 descends to the position shown in FIG. 8e and the manipulator pincers 73 release the sheet 23 retained between the two dies.

In the following phase (FIG. 8f), the die 3 descends further forming the second bend 210.

Then the heads 10 rise again and upon turning grip the leaf 205 of the sheet 23 with the pincers 73.

In the subsequent phase (FIG. 8g) after the press 1 has opened again, the heads 10 are reorientated, positioning the leaf 206 of the sheet 23 in such a way that its edge comes into contact with the sensors 66, repositioned for the production of the third bend 220. The sheet 23 is then locked in the press 1, released by the pincers 73, and then the third bend 220 is formed (FIG. 8h.)

Subsequently the head 10 performs a rotation about its axis 150 and translates gripping the sheet 23 by means of the pincers 72 (FIG. 8h.)

In the following phase, the press 1 is opened again and the leaf 206 of the sheet 23 is inserted between the die 2 and the die 3 until the rear edge comes into contact with the sensors 66 as illustrated in FIG. 8i, for the production of the fourth bend 230. Subsequently, the sheet 23 is released from the pincers 72, and the press 1 forms the fourth bend 230. As can be established from FIG. 8j, after the production of the fourth bend a part of the leaf 206 of the sheet 23 envelops the die 3. This prevents or renders difficult the disengagement of the sheet 23 from the die 3 during its rising movement.

The two heads 10 gripping the sheet 23 with the pincers 72 are therefore raised and simultaneously rotated about their axis of rotation 150 during the elevation of the die 3 so as to release the sheet 23 from the die 3 (tracking.)

After the sheet 23 has been completely removed from the press 1, the heads 10 move completely away from the press 1 to reach the auxiliary pincers 12 as schematically shown in FIG. 8k.

The auxiliary pincers 12 grip the edge of the leaf 205 of the sheet 23 (FIG. 8k) along its longitudinal edge, and the manipulator pincers 72 disengage from the lateral edges of the leaf 206; subsequently (FIG. 8l) the auxiliary pincers 12 invert the sheet 23 by rotation of the beam 14, then the manipulator pincers 72 grip the leaf 205 of the sheet 23 again, and finally the auxiliary pincers 12 open and move away.

In the next successive phase (FIG. 8m) the two heads 10 move down again, reorientate themselves with the gripper plane of the pincers 72 horizontal and advance to carry an edge of the leaf 205 of the sheet 23 into contact with the sensors 66 at the height prearranged for the production of the fifth bend 240.

Subsequently the manipulator pincers 72 release the sheet 23 retained between the die 2 and the die 3, and the die 3 descends to the position corresponding to FIG. 8n and forms the fifth bend 240.

Subsequently the pincers 72 grip the leaf 206 of the sheet 23 again, the press 1 is re-opened, and the heads 10 are displaced in such a way as to position the leaf 205 of the sheet 23 as illustrated in FIG. 8o. After this, the sheet 23 is locked between the die 2 and the die 3, and pincers 72 open releasing the sheet 23. Finally, the press 1 closes further (FIG. 8p) in such a way as to form the sixth and final bend 250 in the leaf 205 of the sheet 23. After this, the pincers 72 grip the completely shaped piece 499.

The press 1 is then re-opened and the manipulator device 4 moves to the discharge table 6 where the pincers 72 release the workpiece 499 which falls onto the plane 30 of the table 6.

In the working cycle just described, it has been supposed, for simplicity, that the pincers 72 and 73 always grip the leaf of the sheet 23 closest to the fold to be formed, but the program of the working cycle can arrange, for certain bending phases, for the further leaf to be gripped.

The creation in the electronic unit 7 of the command and control signals for a sheet metal bending cycle of the type illustrated above is conveniently achieved by means of the system described in the patent application entitled "A System for the Automatic Creation of Control Signals for the Operating Cycles of a Robot Manipulator Device of a Sheet Metal Bending Installation."

The electronic unit 7 is in fact provided with a program by which it is possible, by means of the portable keyboard 11 (hand box), or possibly by mean of the keyboard 8, to define a complete sequence of operating phases which can be performed by the sheet metal bending installation 500.

Figure 11:
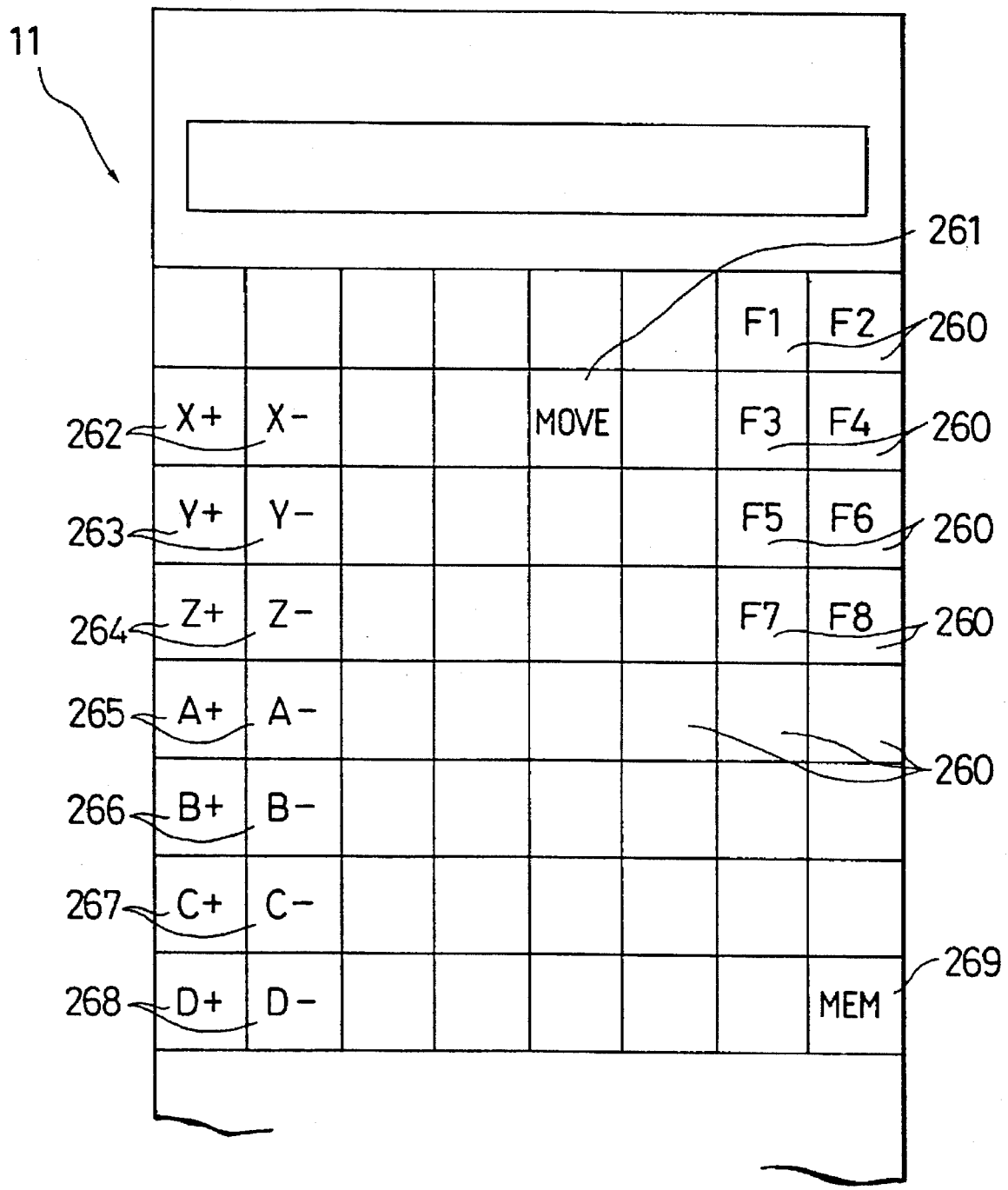
FIG. 11 shows a portable keyboard utilized for sending control signals to the control unit of FIG. 1 to produce the profile shown in FIG. 7.

With particular reference to FIG. 11 the keyboard 11 is provided with a plurality of function keys 260 each of which is adapted to define a complete sequence of command and control signals for the sheet metal bending installation 500, for a respective phase in the cycle by which a shaped sheet metal profile is formed, for example of the type illustrated in FIG. 7. These sequences of control and command signals, corresponding to each of the function keys 260, are conveniently memorized in a memory block of the electronic unit 7.

In particular, the keys 260 are indicated with a letter "F" to define that this key is a function key and with number indicated after the letter "F" to distinguish the various operating functions which can be achieved by means of the key 260.

With reference to FIG. 11, the various function keys 260 are listed and their significance is explained as follows:

F1.—command opening of the pincers 72

F2.—command closure of the pincers 72

F3.—command opening of the pincers 73

F4.—command closure of the pincers 73

F5.—raise the auxiliary metal sheet support device 110 and command activation of the upper suckers 120

F6.—raise the auxiliary metal sheet support device 110 and command activation of the lower suckers 119

F7.—command lowering of the auxiliary metal sheet support device 110 and disactivate the suckers 119 and 120

F8.—raise the auxiliary metal sheet support devices 110 and 121 and command activation of the upper suckers 120 and 123

F9.—raise the auxiliary metal sheet support devices 110 and 121 and command activation of the lower suckers 119 and 122

F10.—command lowering of the auxiliary metal sheet support devices 110 and 121, and disactivate the suckers 119, 120, 122 and 123

F13.—command closure of the auxiliary pincers 12 and approach of the beam 14 to the press 1

F14.—command opening of the auxiliary pincers 12 and approach of the beam 14 to the press 1

F15.—command rotation of the beam 14 and then inversion of the metal sheet 23

F17.—execute the alignment procedure to align the metal sheet 23 against the rear sensors 66 of the press 1, and grip, without deformation, the metal sheet 23 between the die 2 and the die 3

F18.—command the press 1 to perform the bending operation on the sheet 23 between the die 2 and the die 3

F19.—command opening of the press 1 and disengagement of the metal sheet 23 from the press 1 when a part of the sheet 23 envelops the die 3 (tracking), with simultaneous displacement of the manipulator heads 10

F20.—command opening of the press 1 and disengagement of the metal sheet 23 from the press 1 without displacement of the manipulator heads 10

F21.—command initiation of the alignment procedure of the metal sheet 23 within the press 1, with the required positioning of the sensors 66 along the Y axis F22.—command loading of the sheet 23 by the loader device 5 by activation of the suckers 28 and displacement of the beam 25 into the gripping position for the manipulator device 4

F23.—command separation of the sheet 23 from the loader device 5 by disactivation of the suckers 28

F24.—command the execution of an initial positioning procedure of the auxiliary metal sheet support devices 110 and 121, and of the beam 14

The keyboard 11 (hand box) is also provided with other keys which can also be used in combination with the function keys 260 to define other instructions which can be executed by the sheet metal bending installation 500. In particular, the keyboard 11 includes a key 261 indicated with the symbol "MOVE" adapted to define command signal instructions for translation of the manipulator device 4 along three axes X, Y and Z. The "MOVE" key 281 is also able to define instructions for signals commanding rotation of the heads 10 about their common axis 150, displacement of the head 10 alone the axis X, and finally rotation of the beam 14 and inclination of the arm 128.

The "MOVE" key 261 is utilized jointly with other keys on the keyboard 11 to define a vector which comprises all the movements listed above and definable by the "MOVE" key itself.

For the definition of these movements the keyboard 11 (hand box) includes:

two keys 262 indicated "X+" and "X−" operable to impart to the beam 46 of the manipulator device 4 a movement in one direction or the other along the X axis;

two keys 263 indicated "Y+" and "Y−" operable to impart to the beam 46 of the manipulator device 4 a movement in one direction or the other along the Y axis;

two keys 264 indicated "Z+" and "z−" operable to impart to the beam 46 of the manipulator device 4 a movement in one direction or the other along the Z axis;

two keys 265 indicated "A+" and "A−" operable to impart to the heads 10 a clockwise rotation or an anti-clockwise rotation about their common axis 150;

two keys 266 indicated "B+" and "B−" operable to displace the heads 10 in one direction or the other along the X axis simultaneously and in opposite directions;

two keys 267 indicated "C+" and "C−" operable to impart to the beam 14 a clockwise or an anti-clockwise rotation about the central support axis of the arm 126; and two keys 268 indicated "D+" and "D−" operable to impart to the arm 126 a clockwise or an anti-clockwise rotation about the pin 128.

Purely by way of non-limitative example, there will now be indicated a vector which includes the instructions for the command signals defined with "MOVE" key 261 together with the keys 262–268.

This vector can be of the form:

MOVE (±X, ±Y, ±Z, ±A, ±B, ±C, ±D)

where MOVE is the instruction defined by the key 261 and X, Y, Z, A, B, C and D are the numerical values inserted by means of the keys 262–268 which represent how far and in which direction the beam 46 of the manipulator 4, the heads 10, the beam 14, and the arm 126 must move with respect to an initial position.

Moreover, it can happen that it is necessary to impart to the manipulator 4 or to the heads 10 instructions to perform consecutive movements; in this case the key 261 can be utilized successively to create a sequence of vectors of the type:

MOVE (±X1, ±Y1, ±Z1, ±A1, ±B1, ±C1, ±D1)

MOVE (±X2, ±Y2, ±Z2, ±A2, ±B2, ±C2, ±D2)

MOVE ( .............................. )

MOVE (±Xn, ±Yn, ±Zn, ±An, ±Bn, ±Cn, ±Dn)

The keyboard 11 further includes a "MEM" key 269 for memorization of the previously made key selections, and the manner of operation of this will be described in more detail below.

Figure 9:
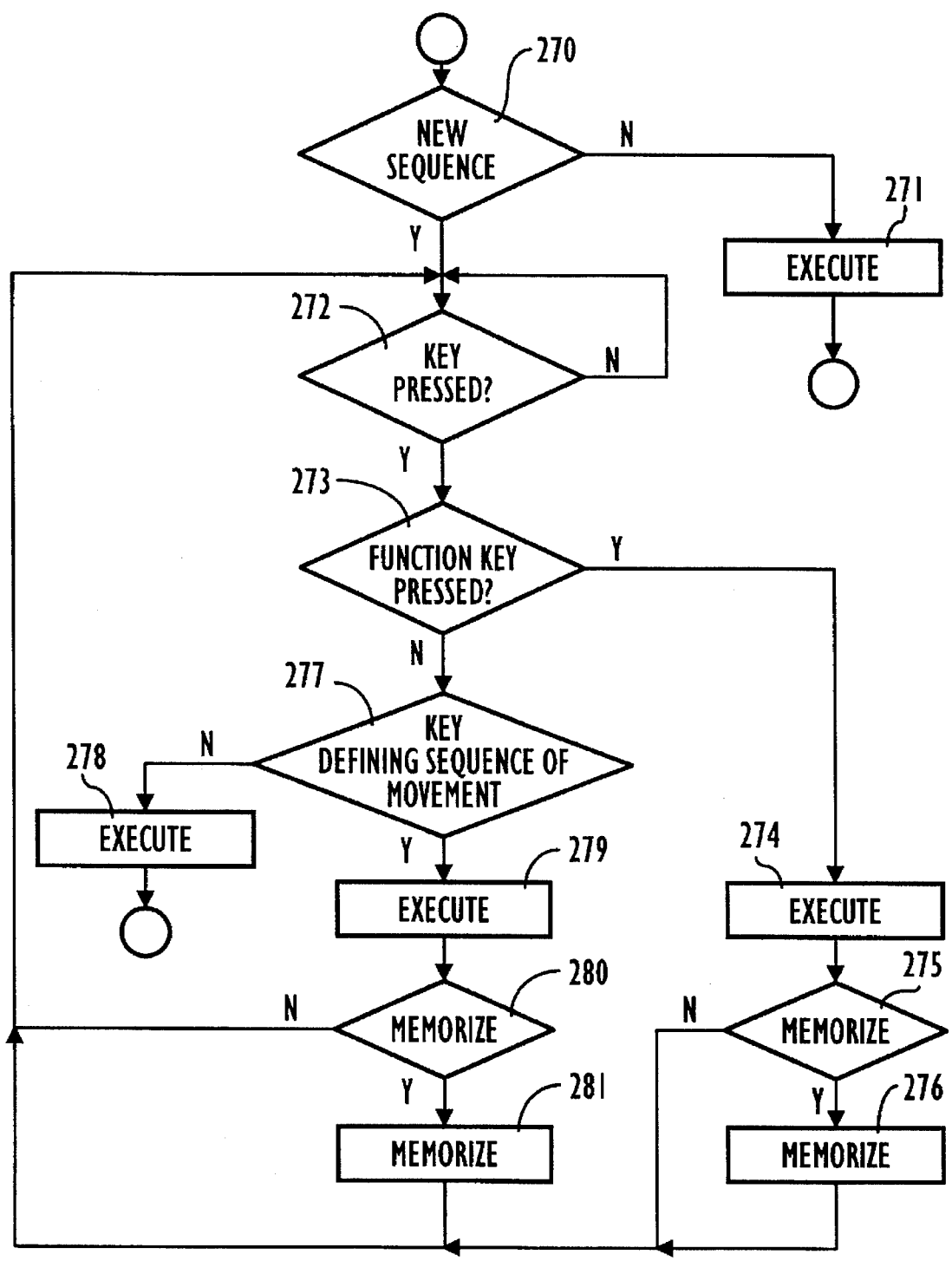
FIG. 9 is a flow chart to show the operation of the electronic control unit illustrated in FIG. 1.

FIG. 9 is a flow chart illustrating the operations performed by the electronic command unit 7 to create the basic sequence of command and control signals for the bending installation 500 so as to be able then to perform the bending cycle previously described to produce the profile illustrated in FIG. 7.

With reference to FIG. 9 the initial block 270 detects if the creation of a new sequence of operating phases has been requested by the operator, for example with the selection on the keyboard 8 or 11, or if the execution of previously memorized operating phases has been requested.

If the creation of a new sequence has been requested the system goes from the block 270 to the block 272 which detects if a key of the keyboard 11 (hand box) has been pressed. In the negative case it remains in closed cycle in this block waiting for a key to be pressed. If a key has already been pressed from the block 272 the system goes to the block 273 which detects if the function key 260 has been pressed. In the positive case, from the block 273 it goes to the block 274 which commands execution of the phases determined by the function key 260 which has been pressed. From the block 274 it goes to the block 275 which detects if the memorization of the selected function key has been requested by means of the key 269. In the positive case it goes to the block 276 which effects memorization of the command signals defined by the selected function key 260, and the successive return to the block 272 to wait for a new selection on the keyboard 11. If this memorization has not been requested, it returns from the block 275 to the block 272 directly.

Returning to the block 273, if this block detects that the function key 260 has not been pressed it goes to the block 277 which detects if the key pressed is the key 261 defining a sequence of movements. If a key has been pressed which is not a key defining a sequence of movements, it moves from the block 277 onto the block 278 which commands execution of the operation requested with this key, and subsequently exits from the program. If the block 277 detects that the key 261 defining an instruction for movement has been pressed, it goes to the block 279 which commands execution of the movement requested by means of the keys 262–268. From the block 279 it then moves to the block 280 which detects if memorization of the selected movements has been requested by means of the key 269. In the positive case it moves from the block 280 to the block 281 which effects memorization of the command signals defined with the selected movement keys 262–268, and then returns to the block 272, while if such memorization has not been requested, it returns from the block 280 to the block 272 directly.

On the other hand, if execution of previously memorized operating phases is requested, as described with reference to blocks 272–281, it goes from the block 270 to the block 271 which commands execution of these operating phases as will be explained in more detail hereinafter. Subsequently, when execution of these operating phases is completely finished, it exits from the program.

Figure 10A:
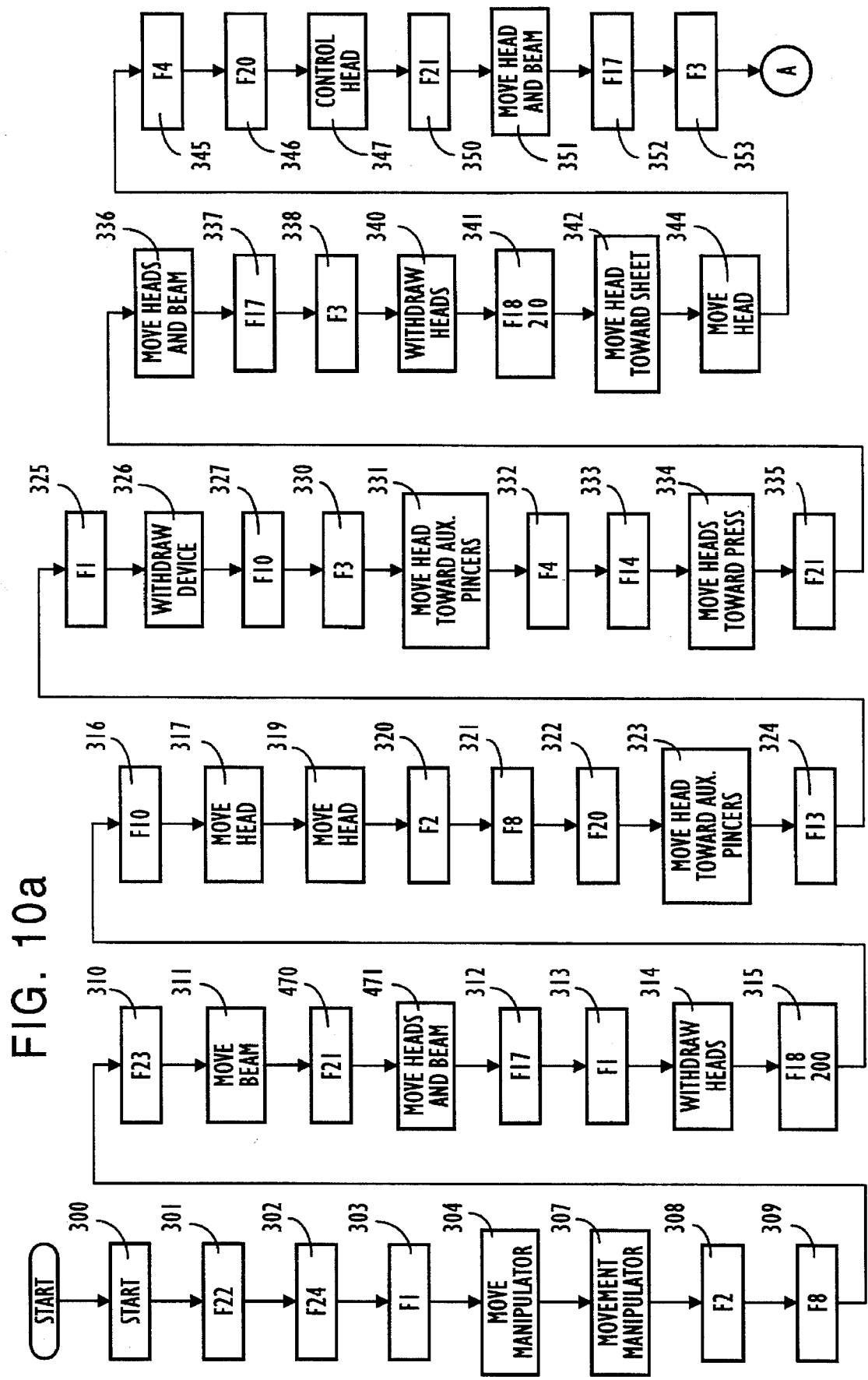

FIGS. 10a and 10b are a flow chart illustrating the operation of the electronic unit 7 with the system of FIG. 9, and define the sequence of command and control signals for the bending installation 500 to perform the bending cycle previously described with reference to FIGS. 8a–8p to obtain the workpiece 499 of FIG. 7. This arrangement therefore has a sequence of blocks which comprise instructions for movement of the parts of the installation (heads 10, press 1, loader device 5, etc.) or instructions for the operation of the installation (defined by the said function keys 260.)

With reference to FIGS. 10a and 10b, the process starts initially at the block 300 which initiates the general starting procedures of the program. From the block 300 it goes to the block 301 which comprises the instructions for the signals to command the loader device to take up the sheet 23 and for the lateral positioning of the bed 20 over the sliding zone of the beam 46 on the guide 34; these instructions are determined by activation of the function key 260 indicated F22 on the keyboard 11.

From the block 301 it goes to the block 302 by means of which the predetermined initial positioning of the auxiliary support devices 110 and 121 and of the beam 14 are defined; this block having been created with the activation of the function key indicated F24.

From the block 302 it goes to the block 303 comprising the instructions for the signals commanding the pincers 72 to open, determined by activation of the function key F1.

From the block 303 it goes to the block 304 which comprises, with a previously defined "MOVE" vector the sequence of instructions created by activation of the key 261 and keys 262 for the coarse movement signals defining the movement of the manipulator device 4 towards the bed 20 for loading the sheet 23.

It then goes to the block 307 which comprises the instructions, created by activation of the key 261 and keys 262, 263, 264, 265, 266 for the final and precise movement of the beam 46 and the gripper heads 10 of the manipulator device 4 so as to carry it and the pincers 72 into the gripping position at the edges of the sheet 23; from this block 307 it moves on to the block 308, defined by the function key F2, which comprises the instructions for the signals for commanding closure of the pincers 72 to grip the sheet 23.

From the block 308 it goes to the block 309 defined by the function key F8, which comprises instructions for command signals for raising the auxiliary support devices 110 and 121 which support the sheet 23, and activation of the suckers 120 and 123.

From the block 309 it then goes to the block 310 defined by the function key F23, which comprises the instructions for separating the loader device 5 from the sheet 23 by means of disactivation of the suction from the suckers 28.

From the block 310 it goes to the block 311 comprising, with the MOVE vector, the instructions for movement of the beam 46 of the manipulator 4 towards the press 1 (carrying the sheet 23.) This block 311 is followed by the block 470, defined by the function key F21 which comprises the instructions for command signals for the sensor positioning procedure (sensors 66) which define the depth of alignment of the sheet 23 into the press 1 (FIG. 8a.)

The block 470 is followed by the block 471 which comprises the instructions for the command signals for moving the heads 10 and the beam 48 of the manipulator device 4 to bring the rear edge of the sheet 23 up to the sensors 66.

From the block 471 it goes to the block 312, defined by the function key F17, which comprises the instructions for signals commanding the procedure for alignment of the sheet 23 in the press 1, in the position for forming the first bend 200, and lowering of the die 3 into contact with the sheet 23 to keep it in position.

The block 312 is followed by the block 313, defined by the function key F1, which comprises the instructions for the command signals for opening the pincers 72.

From the block 313 it goes to the block 314 which comprises the instructions for command signals for withdrawing the manipulator heads 10 from the manipulation space 139.

From the block 314 it goes to the block 315 defined by the function key F18, which comprises the instructions for command signals to the press 1 to form the first bend 200.

From the block 315 it goes to the block 316, defined by the activation of the function key F10, comprising the instruction for command signals to lower the support devices 110 and 121 and disactivate the suckers 120 and 123.

From the block 316 it goes to the block 317 which comprises the instructions for the command signals for movement of the manipulator head 10 towards the bent sheet 23.

From the block 317 it goes to the block 319 which comprises the instructions for command signals for the final and precise movement of the manipulator device 4 in such a way that the manipulator heads 10 arrive at a position such as to grip the folded sheet 23 (FIG. 8b.)

Subsequently, it goes from the block 319 to the block 320, defined by the function key F2, comprising the instructions for command signals for closure of the pincers 72 to grip the sheet 23.

From the block 320 it goes to the block 321, defined by the function key F8, which comprises instructions for command signals to raise the auxiliary support devices 110 and 121 as already described.

From the block 321 it goes to the block 322 defined by the activation of the function key F20, which comprises the instructions for command signals for opening the press 1 and release of the metal sheet 23.

From the block 322 it then goes to the block 323 which comprises the instructions for the command and control signals for moving the manipulator 4 (which supports the bent sheet 23) towards the auxiliary pincers 12 (FIG. 8c.)

From the block 323 it goes to the block 324 defined by the function key F13, which comprises the instructions for command signals for closure of the auxiliary pincers 12 to grip the sheet 23.

The block 324 is followed by the block 325, defined by the function key F1, which comprises the instructions for the command signals for opening the pincers 72 to release the sheet 23.

From the block 325 it goes to the block 326 which comprises the sequence of instructions for command signals to withdraw the device 4 from the manipulation space 139.

From the block 326 it goes to the block 327, defined by the function key F10, comprising the instructions for the command signals for lowering the devices 110 and 121.

The block 327 is followed by the block 330 defined by the function key F3, which comprises the instructions for opening the pincers 73.

From the block 330 it goes to the block 331 which defines the commands for movement of the heads 10 of the manipulator devices 4 towards the auxiliary pincers 12 to grip the sheet 23 again on the outermost leaf 205 (FIG. 8d.)

Subsequently, from the block 331 it goes to the block 332, defined by the function key F4, comprising the instructions for command signals to control closure of the pincers 73 to grip the sheet 23.

From the block 332 it goes to the block 333 to defined by the function key F14, which comprises the instructions for the command signals to control the reopening of the auxiliary pincers 12 to release the sheet 23.

From the block 333 it goes to the block 334 which defines the commands for movement of the heads 10 of the manipulator device 4, with the sheet 23, towards the press 1.

The block 334 is followed by the block 335, defined by the function key F21, which comprises the instructions for the signals to command the procedure for positioning the sensors 66 (FIG. 8e.)

The block 335 is followed by the block 336 which comprises the instructions for the command signals for movement of the heads 10 and the beam 46 of the manipulator device 4 to cause the rear edge of the sheet 23 to approach the sensors 66.

From the block 336 it goes to the block 337 defined by the function key F17, which comprises the instructions for command signals for the procedure for alignment of the sheet 23 in the press 1, and gripping it between the dies 2 and 3.

The block 337 is followed by the block 338, defined by the function key F3, which comprises the instructions for signals commanding opening of the pincers 73.

From the block 338 it goes to the block 340 which comprises the instructions for command signals for withdrawal of the heads 10 of the device 4 from the bending zone.

From the block 340 it moves on to the block 341, defined by the function key F18, which comprises the instructions for command signals to the press 1 to form the second bend 210 (FIG. 8f.)

From the block 341 it goes to the block 342 which comprises the instructions for the command signals for movement of the heads 10 of the manipulator device 4 towards the sheet 23, which now has the two bends 200 and 210.

The block 342 is followed by the block 344 which comprises the instructions for signals commanding the final and precise movement of the manipulator device 4 in such a way that the pincers 73 of the manipulator head 10 are moved to a position adapted to grip the leaf 205 of the bent sheet 23.

Subsequently, after the block 344 it goes to the block 345 defined by the function key F4, which comprises instructions for command signals for closure of the pincers 73 to grip the sheet 23.

From the block 345 it goes to the block 346, defined by the function key F20, which comprises instructions for command signals for opening the press 1 and release of the metal sheet 23.

From the block 346 it goes to the block 347 which comprises the instructions for command signals for controlling movement of the manipulator heads 10, for repositioning the metal sheet 23 in the press 1.

The block 347 is followed by the block 350, defined by the function key F21, which comprises the instructions for command signals for controlling the procedure for repositioning the sensors 66, for achieving the third bend 220 (FIG. 8g.)

The block 350 is followed by the block 351 which comprises the instructions for signals commanding the movement of the head and the beam 46 of the manipulator device 4 to bring the rear edge of the sheet 23 up to the sensors 66.

From the block 351 it goes to the block 352 defined by the function key F17, which comprises the instructions for the signals commanding the procedure for alignment of the sheet 23 in the press 1, and gripping it between the dies 2 and 3.

The block 352 is followed by the block 353, defined by the function key F3, which comprises the instructions for signals commanding opening of the pincers 73.

From the block 353 it goes to the block 354 which comprises the instructions for signals commanding disengagement of the heads 10 of the device 4 from the bending zone.

From the block 354 it goes to the block 355, defined by the function key F18, which comprises the instructions for signals commanding the press 1 to form the third bend 220 (FIG. 8h.)

The block 355 is followed by the block 356 defined by the function key F1, which comprises the instructions for the signals commanding opening of the pincers 72 to prepare them for the subsequent gripping of the sheet 23.

From the block 356 it goes to the block 357 which comprises the Instructions for signals commanding movement of the heads 10 of the manipulator device 4 towards the sheet 23, which now has three bends 200, 210, 220.

The block 357 is followed by the block 359 which comprises the instructions for the command signals for the final and precise movement of the manipulator device 4 in such a way that the pincers 72 of the manipulator heads 10 are moved into a position adapted to grip the leaf 205 of the bent sheet 23.

Subsequently, after the block 359 it goes to the block 360, defined by the function key F2, which comprises the instructions for the signals commanding closure of the pincers 72 to grip the sheet 23.

From the block 360 it goes to the block 361, defined by the function key F20, which comprises the instructions for signals commanding the opening of the press 1 and release of the metal sheet 23.

From the block 361 it goes to the block 364, defined by the function key F8, which comprises the instructions for command signals to raise the auxiliary support devices 110 and 121, activating the suckers 120 and 123.

From the block 364 it goes to the block 365 which comprises the instructions for command signals for the movement of the manipulator heads 10, for repositioning the leaf 206 of the metal sheet 23 in the press 1.

The block 365 is followed by the block 366, defined by the function key F21, which comprises the instructions for command signals for the procedure for repositioning the sensors 66 for forming the fourth bend (FIG. 8i.)

The block 366 is followed by the block 367, defined by the function key F17, which comprises the signals for commanding the procedure for alignment of the sheet 23 in the press, and gripping it between the dies 2 and 3.

The block 367 is followed by the block 368, defined by the function key F1, which comprises the instructions for the signals for commanding opening of the pincers 72.

From the block 368 it goes to the block 370 which comprises the instructions for command signals for withdrawal of the head 10 of the device 4 from the bending zone.

From the block 370 it goes to the block 371, defined by the function key F18, which comprises the instructions for command signals to the press 1 to form the fourth bend 230 (FIG. 8j.)

From the block 371 it moves on to the block 372, defined by the function key F10, which comprises the instructions for command signals for lowering and disactivation of the auxiliary support devices 110 and 121.

From the block 372 it goes to the block 373 which comprises the instructions for the command signals for movement of the heads 10 of the manipulator device 4 towards the sheet 23, which now has four bends 200, 210, 220 and 230.

The block 373 is followed by the block 375 which comprises the instructions for command signals for the final and precise movement of the manipulator device 4 in such a way that the pincers 72 of the manipulator heads 10 are disposed in a position suitable for gripping the leaf 206 of the bent sheet 23.

After the block 375 it goes to the block 376, defined by the function key F2, which comprises the instructions for command signals for the closure of the pincers 72 to grip the sheet 23.

From the block 376 it goes to the block 377, defined by the function key F8, which comprises the instructions for command signals to raise the auxiliary support devices 110 and 121.

From the block 377 it goes to the block 378, defined by the function key F19, which comprises the instruction for signals commanding opening of the press 1 and the simultaneous movement of the manipulator heads 10 for the disengagement of the metal sheet 23.

From the block 378 it goes to the block 379 which comprises the instructions for command signals for the movement of the manipulator 4 (which supports the bent sheet 23) towards the auxiliary pincers 12 (FIG. 8k.)

From the block 379 it goes to the block 380, defined by the function key F13, which comprises the instructions for command signals for closing the auxiliary pincers 12 to grip the metal sheet 23.

From the block 380 it goes to the block 381, defined by the function key F1, which comprises the instructions for command signals for opening the pincers 72 of the heads 10.

From the block 381 it goes to the block 382 which comprises the instructions for command signals for withdrawal of the device 4 from the manipulation space 139.

From the block 382 it goes to the block 383, defined by the function key F10, which comprises the Instructions for command signals for lowering the devices 110 and 121.

From the block 383 it goes to the block 384, defined by the function key F15, which comprises the instructions for command signals for rotating the beam 14 and lowering the sheet 23 (FIG. 8l.)

From the block 384 it goes to the block 385 which comprises the instructions for the signals commanding movement of the heads 10 towards the auxiliary pincers 12.

From the block 385 it goes to the block 450, defined by the function key F2, which comprises the instructions for signals commanding closure of the pincers 72.

The block 450 is followed by the block 451, defined by the function key F14, which comprises the instructions for the command signals for opening the auxiliary pincers 12.

From the block 451 it goes to the block 452 which comprises the instructions for the command signals for movement of the head 10 towards the press 1.

The block 452 is followed by the block 386, defined by the function key F21, which comprises the instructions for signals commanding the procedure for a new positioning of the sensors 66 (FIG. 8m.)

The block 386 is followed by the block 387, defined by the function key F17, which comprises the instructions for signals commanding the procedure for alignment of the sheet 23 in the press 1 and gripping it between the dies 2 and 3.

The block 387 is followed by the block 388, defined by the function key F1, which comprises the instructions for signals commanding opening of the pincers 72.

From the block 388 it goes to the block 390 which comprises the instructions for signals commanding withdrawal of the heads 10 of the device 4 from the bending zone.

From the block 390 it goes to the block 391, defined by the function key F18, which comprises the instructions for signals commanding the press 1 to form the fifth bend 240 (FIG. 8n.)

The block 391 is followed by the block 460 which comprises the instructions for command signals for movement of the heads 10 of the manipulator 4 towards the sheet 23 which now has five bends 200, 210, 220, 230 and 240.

The block 460 is followed by the block 392 which comprises the instructions for signals commanding the final and precise movement of the manipulator device 4 in such a way that the pincers 72 of the manipulator heads 10 are disposed in a position adapted to grip the leaf 206 of the bent sheet 23.

Subsequently, from the block 392 it goes to the block 393, defined by the function key F2, which comprises the instructions for command signals for closing the pincers 72.

From the block 393 it goes to the block 461, defined by the function key F20, which comprises the instruction for signals commanding opening of the press 1, and release of the metal sheet 23.

The block 461 is followed by the block 394 which comprises the instructions for signals commanding the movement of the manipulator heads 10, and the repositioning of the metal sheet 23 in the press 1 (FIG. 8o.)

From the block 394 it goes to the block 395, defined by the function key F21, which comprises the instructions for signals commanding the procedure for the new positioning of the sensors 66.

The block 395 is followed by the block 396, defined by the function key F17, which comprises the instructions for the signals commanding the procedure for aligning the sheet 23 in the press 1, and gripping it between the dies 2 and 3.

The block 396 is followed by the block 397, defined by the function key F1, which comprises the instructions for signals commanding the opening of the pincers 72.

From the block 397 it goes to the block 400 which comprises the instructions for the signals commanding withdrawal of the heads 10 of the device 4 from the bending zone.

From the block 400 it moves on to the block 401, defined by the function F18, which comprises the instructions for the command signals to the press 1 to form the sixth, and final, bend 250 (FIG. 8p.)

From the block 401 it goes to the block 402 which comprises the Instructions for the command signals for movement of the heads 10 of the manipulator device 4 towards the finished workpiece 499.

The block 402 is followed by the block 404 which comprises the instructions for the command signals for final and precise movement of the manipulator device 4 in such a way that the manipulator heads 10 are disposed in a position adapted to grip the bent workpiece 499.

Subsequently, from the block 404 it goes to the block 405, defined by the function key F2, which comprises the instructions for command signals for closure of the pincers 72.

From the block 405 it goes to the block 406, defined by the function key F20, which comprises the instructions for command signals for opening the press 1 and release of the workpiece 499.

From the block 406 it goes to the block 410 which comprises the instructions for command signals for the movement of the manipulator device 4 to the position for transforming the workpiece 499 to the discharge table 6.

The block 410 is followed by the block 411, which comprises instructions for command signals for the final and precise movement of the manipulator device 4 in such a way that one side of the workpiece 499 rests on the inclined support plane 30 of the discharge table 6.

From the block 411 it goes to the block 412, defined by the function key F1, which comprises the instructions for command signals for opening the pincers 72 to release the workpiece 499.

From the block 412 then it leaves the sheet bending phases definition cycle.

A sequence of control signals of the type described above can easily be derived by means of the electronic unit 7a away from the bending installation 500 previously described, according to the system forming the subject of the present invention, and this sequence can advantageously be utilized for operating control of the bending cycle of the installation 500.

In particular, according to the system forming the subject of the present invention, the simplified representation of a transverse section of the bending installation 500 taken on the plane YZ conjointly with several keys present on the keyboard 11, and other keys, is displayed on the video 9 to a user who, by means of the keys of the keyboard 8a, can move the parts of the bending installation presented on the video by utilizing all the commands which are also present on the keyboard 11, and can create a complete sequence of control signals which can be memorized in the electronic unit 7a and subsequently executed by the bending Installation 500. In this way an operator can produce a complete sequence of control signals ready to be used on the real installation, working in a manner which is completely independent of the bending installation 500 itself.

Figure 15:
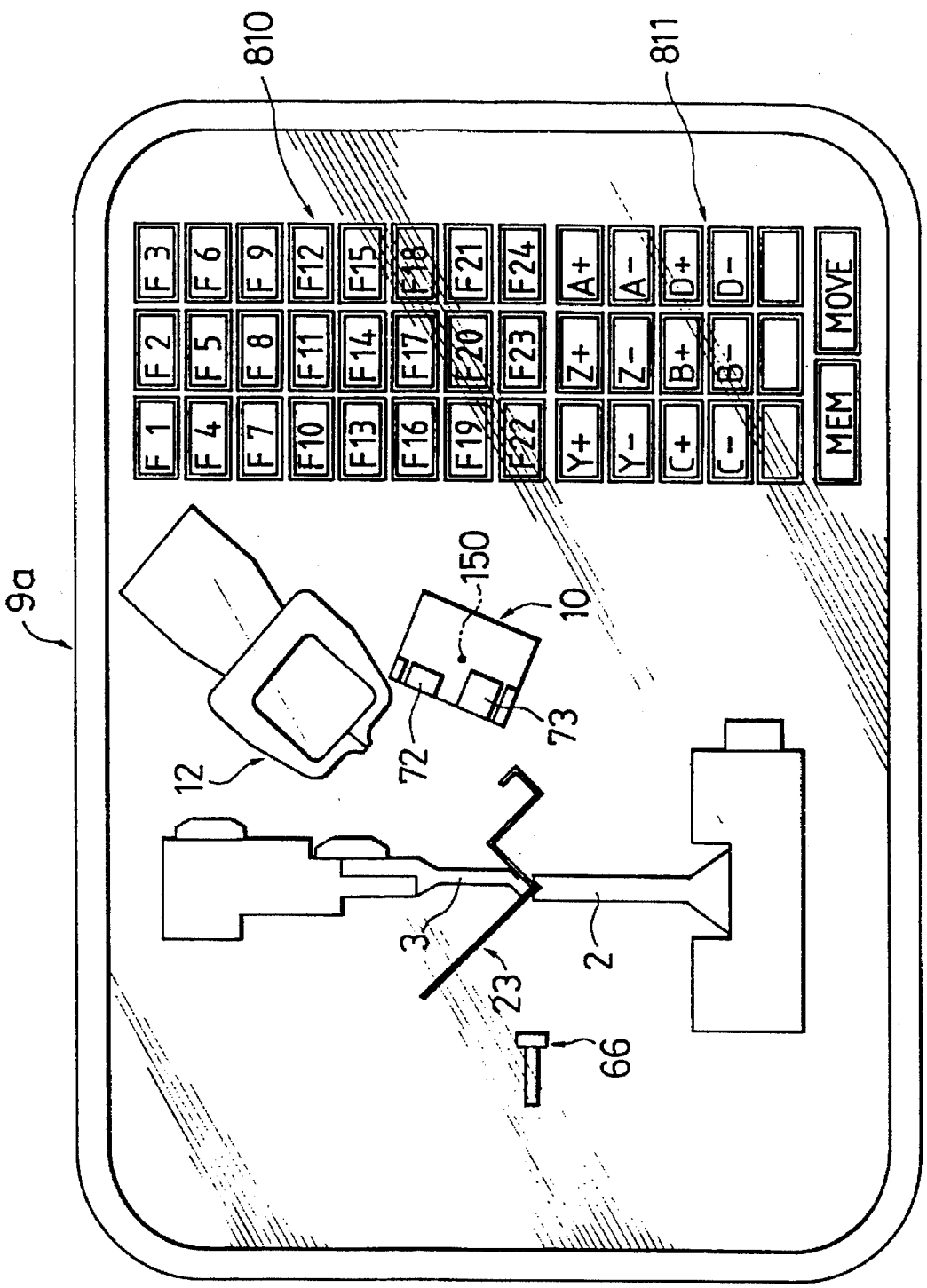
FIG. 15 shows a video screen on which the bending installation in cross section and several keys on the keyboard illustrated in FIG. 11 are displayed.

With particular reference to FIG. 15 there is indicated, also by way of illustrative example, one of the possible configurations which can be assumed by the bending installations 500, which can be presented to an operator on the video 9a according to the system forming the subject of the present invention.

In particular, the die 2 and the die 3 of the press 1 are schematically displayed, in cross section, in the central region of the video 9a, together with the sensor 66 for detecting the position of the edge of the metal sheet 23 for determining the position of the bend. A head 10 provided with the pincers 72 and 73 is also shown in front view and the metal sheet 23 is shown in cross section. Finally, one of the auxiliary pincers 12 of the auxiliary support 114 (which is not shown) is shown in schematic cross section. These parts are advantageously represented on the video 9a in different colors to make them easily distinguishable from one another.

In the right hand upper part of the video 9a (which is approximately rectangular) there is shown a first keyboard 810 comprising twenty four keys each of which has a function entirely analogous to the function keys 260 of the keyboard 11, and is distinguished by a letter "F" and a sequential number.

Figure 16:
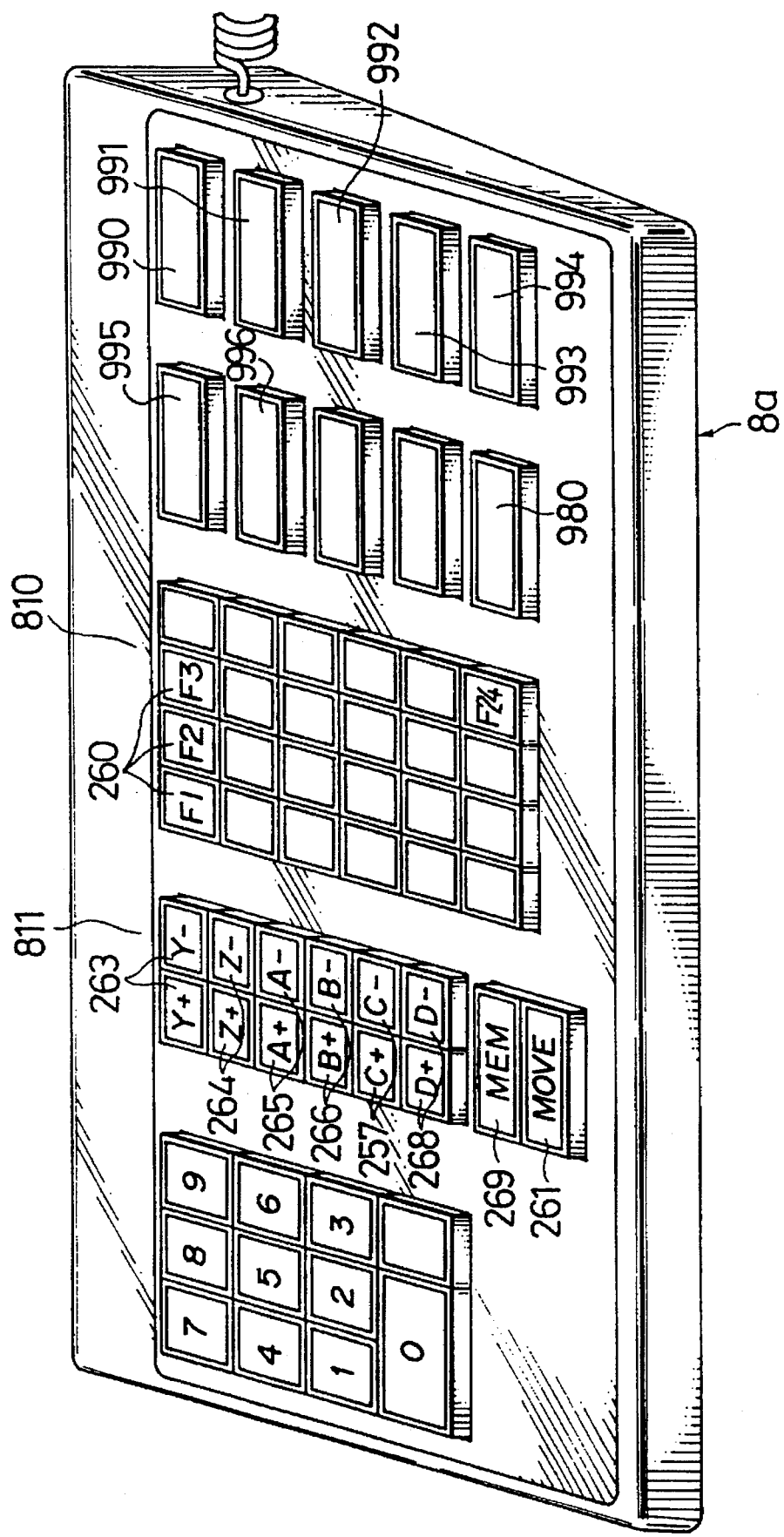
FIG. 16 illustrates an alphanumeric keyboard utilized for simulating the bending installation according to the present invention.

In the lower right hand part of the video 9a there is represented a second keyboard 811 comprising a key for memorization of the sequences created, and indicated with the letters "MEM", a key for movement of the parts of the installation 500 shown on the video, indicated with the letters "MOVE", and twelve keys for movement of the various parts of the installation, corresponding respectively to the keys indicated on the keyboards 11 by the numerals 260, 262, 263, 264, 265, 266, 267 and 268. All the keys displayed on the video are also physically present on the keyboard 8a (FIG. 16) and are indicated in the same way as they are represented on the video 9a.

The keyboard 8a is also provided with other keys, which are not present on the keyboard 11, to activate auxiliary functions the significance of which will be clarified hereinafter.

From what has been explained, It is clear that an operator positioned in front of the video 9a is provided with all the instruments necessary to move the parts of the bending installation 500 and, having a faithful representation of the real installation 500 itself, can set up a complete sequence of control signals usable on a real bending installation 500.

The video representation described above is only one of the possible representations provided by the system of the present invention; in particular this representation is preceded by other representations which serve to permit the user to define the parameters of the installation 500.

A more detailed description of the system which permits this simulation will now be given. In particular, with reference to FIG. 13, there is shown a logic flow chart comprising the principal stages by which the system constituting the subject of the present invention; this logic flow chart is formed by a series of instructions resident in the electronic unit 7a.

It starts with the first block 899 which commands presentation on the video 9a of the data relating to the dimensional parameters identifying a bending installation 500, and which also identify a metal sheet 23 and an associated bending cycle already memorized to obtain a finished workpiece 499 with a profile for example as shown in FIG. 7; this then leads to the block 900 in which the user is asked, and this request is illustrated on the video 9a, if it is desired to modify the existing cycle or create a new bending cycle with associated simulation.

If the answer is "no" it exits from the program, while if the answer is "yes" it goes to the Analysis block 901 in which the operator introduces or modifies data characterizing the dimensions and behaviour of the installation 500 and the sheet 23. This block, which will be described in more detail below, presents on the video a series of questions to which the operator responds by Introducing numerical values by means of the keyboard 8a.

From the block 901 it goes to the Construction block 902 which presents on the video 9a a representation of a bending installation of the type described above and adapts it to the numerical values of the dimensions inserted in the block 901. This block 902, which will be illustrated in more detail hereinafter, comprises the instructions which permit an operator to produce signals for controlling the various stages of a complete sheet metal bending cycle by utilizing the keyboard 8a, and to see on the video 9a the representation of each stage of the cycle. Finally the block 902 provides for memorization, in the memory of the electronic unit 7a, of the sequence of control signals created.

From the block 902 it goes to the Simulation block 903 which presents on the video 9a successive positions of the bending installation 500 corresponding to the stakes previously created and memorized with the block 902. In this way the various configurations of the bending installation 500 are presented to the user in such a way that the succession of images gives the impression of the installation 500 in motion.

Figure 14A:
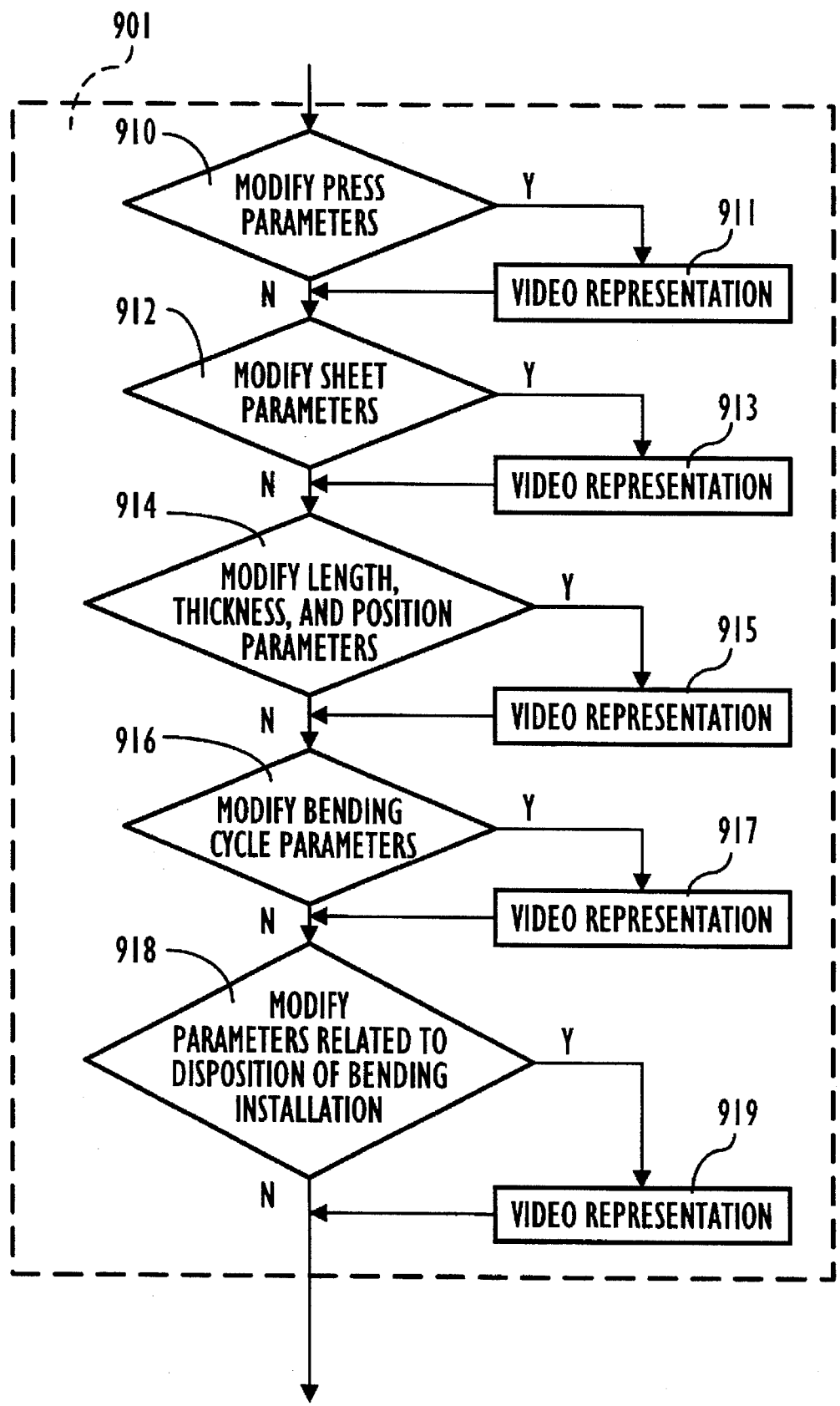
FIG. 14*a*, 14*b* and 14*c* are flow charts respectively showing the details of blocks of the flow chart shown in FIG. 13.

The block 901 is illustrated in detail in FIG. 14a, this block comprising the first block 910 which detects if the operator has to choose whether or not he desires to effect a modification of the parameters relating to the press 1, that is relating to the shape and dimensions of the die 2 and the die 3. In the positive case, from the block 910 It goes to the block 911 which commands the presentation on the video 9a of any values which may already be memorized thus displaying the shape of these dies 2 and 3, and allows the operator to modify or choose these values by means of the keyboard 8a; in the negative case it goes from the block 910 to the block 912.

The block 912 detects if the operator has to choose whether or not he desires to effect a modification of the parameters relating to the metal sheet 23, that is relating to the length and to the thickness of the metal sheet 23. In the positive case, from the block 912 it goes to the block 913 which commands the presentation on the video 9a of values relating to the metal sheet, which may already be memorized, and allows the operator to modify or choose these values by means of the keyboard 8a. In the negative case it goes from the block 912 to the block 914.

The block 914 detects if the operator has to choose whether or not to effect a modification of the parameters relating to the head 10, in particular relating to the length, thickness and position assumed by the pincers 72 and 73 in the head 10. In the positive case it goes from the block 914 to the block 915 which commands the presentation on the video 9a of the values relating to the heads 10 which may already be memorized, and thus also of the shape of the head 10 with the pincers 72 and 73, and allows the operator to modify or to choose these values by means of the keyboard 8a. In the negative case it goes from the block 914 to the block 916.

The block 916 detects if the operator has to choose whether or not to effect a modification of a group of parameters relating to the bending cycle, in particular relating to the angles of the bend In the sheet 23 and to 35 the length of the various portions into which the sheet 23 is bent, and which determines the position of the sensors 66. In the positive case it goes from the block 916 to a block 917 which commands the presentation on the video 9a of any previously memorized values relating to the bending cycle, and therefore also the final shape which the workpiece must assume, for example as shown in FIG. 7, and allows the operator to modify or choose these values by means of the keyboard 8a. In the negative case it goes from the block 918 to the block 918.

The block 918 detects if the operator has to choose whether or not to effect a modification of a set of parameters relating to the disposition of various parts of the bending installation 500, in particular relating to the distances (measured along the X axis) of the loader device 5 and the discharge table 6 with respect to the press 1. In the positive case, from the block 918 it goes to the block 919 which commands the presentation on the video 9a of any already memorized values relating to the numerical values of these distances, and allows the operator to modify or choose these values by means of the keyboard 8a; in the negative case it goes from the block 918 to the block 902 of FIG. 13 to which it also leads after leaving the block 919.

Figure 13:
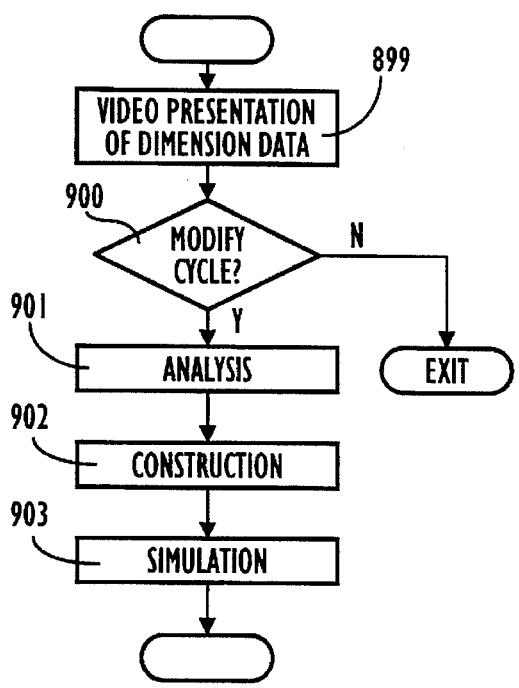
FIG. 13 is a flow chart illustrating the operation of the control unit utilized in the system of the present invention.
Figure 14B:
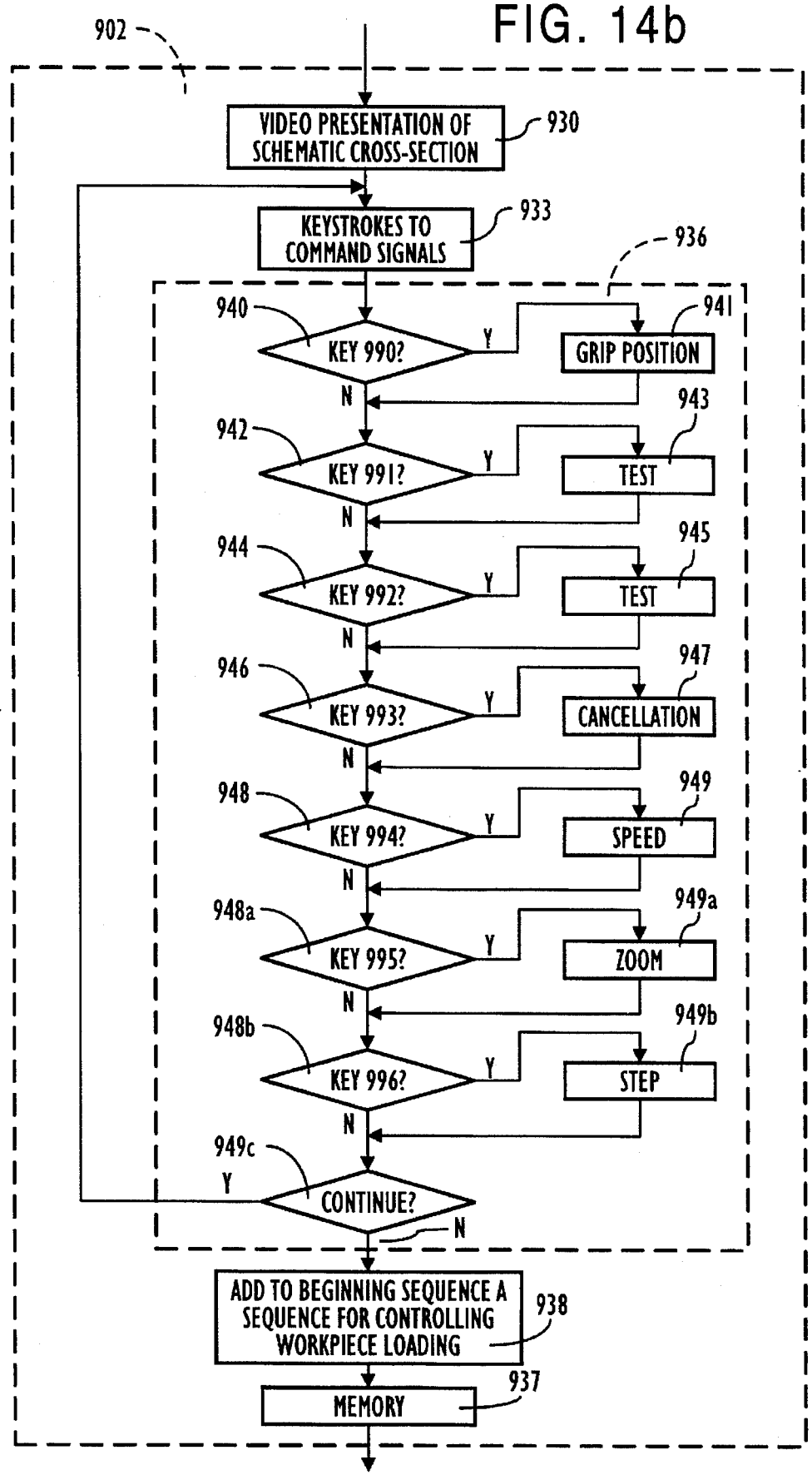

With particular reference to FIG. 14b the block 902 of FIG. 13 is illustrated in detail.

Initially this starts at the block 930 which commands the presentation on the video 9a of a schematic cross section of the bending installation 500 on a reduced scale, as illustrated in FIG. 15, commands the presentation on the video 9a of the first keyboard 810 provided with the twenty four function keys, of the second keyboard 811 provided with the "MOVE" and the "MEM" keys, and of the other movement keys as previously described.

From the block 930 it goes to the block 933 which transforms the signals from the keys on the keyboard 8a corresponding to keys represented on the video 9a into command signals which permit the representation on the video 9a of the function assigned to each respective key. In this way, for example, when an operator presses the key F1 on the keyboard 8a the block 933 commands the presentation on the video 9a of the opening of the pincers 72. The block 933 further creates for each key actuated the corresponding command signal which can be executed by the bending installation 500 as if it had been created with the corresponding key 260 on the keyboard 11.

In particular, with the selected function keys 260 on the keyboard 8a command signals for the installation 500 are created in a manner analogous to when they are selected on the portable keyboard 11, and the associated blocks defined by the function keys of FIGS. 10a and 10b are therefore created in a corresponding manner. With the pairs of keys 263 (Y+, Y−), 264 (Z+, Z−), 265 (A+, A−) on the keyboard 8a the signals for commanding movement of the heads 10 in the plane YZ, and rotation about the axis 150 are created.

The pair of keys 266 (B+, B−) on the keyboard 8a create command signals for movement of the heads 10 along the X axis, to position them over or separate them from the edges of the metal sheet 23; since this displacement of the heads 10 along the X axis cannot be represented on the YZ plane of the video 9a the magnitude of this approach or separation movement is conveniently automatically defined by the block 933 on the basis of the dimensions of the heads 10 and the metal sheet 23 previously fixed with the block 901.

With the pair of keys 267 (C+, C−) on the keyboard 8a there are created command signals for rotation of the beam 14, and thus of the auxiliary pincers 12, while with the pair of keys 268 (D+, D−) on the keyboard 8a there are created command signals for inclination or raising of the arm 126 which supports the auxiliary pincers 12, which are therefore correspondingly represented or not represented on the video 9a.

The selection of these command keys 263–268 creates, in a manner corresponding to that described hereinbefore for the portable keyboard 11, the related movement command blocks illustrated in FIGS. 10a and 10b, and therefore by selection of a combination of function keys 260 it is possible to obtain the sequence of the bending cycle defined by the blocks from 313 to 406 in the said FIGS. 10a and 10b.

Therefore, by means of the block 933, an operator working on the keyboard 8a obtains not only a simulated representation of the real operation of the bending installation 500, but also the creation of a complete sequence of command signals which can be executed by the bending installation 500.

This block further commands the representation, in the upper region of the video 9a, of three sections of the bending installation 500 and the metal sheet 23 corresponding, respectively, to the current operating condition determined by the activation of the key on the keyboard 8a, and represented overall on the video 9a, and to the preceding or following bending conditions respectively (as are illustrated for example in FIGS. 8a–8p) conveniently determined by means of the block 917 of FIG. 14a for definition of the various successive bends of the finished workpiece 499. The block 933 is followed by the block 936 which activates a group of said functions, which cannot be achieved by means of the keyboard 11, and constitute a valuable aid to the operator for achieving on the video a sequence of perfectly functioning command signals.

In particular, the block 936 activates a plurality of aid functions usable in critical situations, each of which can be called up by pressing a respective appropriate function key of the keyboard 8a (and not present on the portable keyboard 11) among which are:

a key 990 called the "GRIP POSITION" function, which is usable when the conditions may be uncertain for the operator to choose the precise region on the sheet 23 to be gripped by the pincers 72 and 73 of the heads 10, in dependence for example on the length of the leaf 205 or 206 and the associated dimensions. In particular, in the case of ambiguity in the grip position of the sheet 23, this function permits the automatic definition of the best choice for the grip, and consequently the position of the pincers 72 or 73 on the sheet 23;

a key 991 called the "TEST" function which permits activation of an interference test which generates a signal to the operator (for example by means of the emission of an acoustic tone) when the metal sheet 23 or a movable part of the manipulator 4 strikes against the fixed structure of the bending installation 500;

a key 992 for disactivating the said "TEST" function; a key 993 called the "CANCELLATION" function which cancels the last command defined by the block 933;

a key 994 called the "SPEED" function which increases or decreases respectively the speed of movement of the manipulator 4;

a key 995 called the "ZOOM" function which permits a detail of the installation 500 represented on the video 9a to be enlarged; and a key 996 called the "STEP" function which permits the representation of the installation 500 on the video 9a to go forward or backward by one step of the movement in the sequence of command signals previously created with the block 933.

In particular, the block 936 includes the first block 940 which checks if the key 990 of the keyboard 8a has been pressed. In the positive case it goes from the block 940 to the block 941 which commands the execution of the "GRIP POSITION" function defined by the key 990, and then goes to the block 942. In the negative case it goes from the block 940 to the block 942 directly.

The block 942 checks if the key 991 on the keyboard 8a has been pressed. In the positive case it goes from the block 942 to the block 943 which commands the activation of the "TEST" function defined by the key 991, and then goes to the block 944. In the negative case it goes directly from the block 942 to the block 944.

The block 944 tests if the key 992 on the keyboard 8a has been pressed. In the positive case it goes from the block 944 to the block 945 which commands the disactivation of the "TEST" function and then goes to a block 946. In the negative case it goes directly from the block 944 to the block 946.

The block 946 tests if the key 993 on the keyboard 8a has been pressed. In the positive case it goes from the block 946 to the block 947 which commands the execution of the "CANCELLATION" function and then goes to the block 948. In the negative case it goes directly from the block 946 to the block 948.

The block 948 tests if the key 994 on the keyboard 8a has been pressed. In the positive case it goes from the block 948 to the block 949 which commands the execution of the "SPEED" function and then goes to the block 948a. In the negative case it goes directly from the block 948 to the block 948a.

The block 948a tests if the key 995 on the keyboard 8a has been pressed. In the positive case it goes from the block 948a to the block 949a which commands the execution of the "ZOOM" function and then goes to the block 948b. In the negative case it goes directly from the block 948a to the block 948b.

The block 948b tests if the key 996 on the keyboard 8a has been pressed. In the positive case it goes from the block 948b to the block 949b which commands the execution of the "STEP" function and then goes to the block 948c. In the negative case it goes directly from the block 948b to the block 948c.

At the block 949c, the user is asked if he wishes to continue to produce sequences of command signals; in the positive case it returns from the block 949c to the block 933; in the negative case it goes to the block 938.

The block 938 acts to complete the sequence of command signals previously created by adding to the beginning of this sequence the first sequence of signals which controls the workpiece loading operations, and by adding to the end of this sequence a second sequence of signals which controls the workpiece discharge operations. The first and the second sequences are added in a completely automatic manner to the sequence of command signals created by the block 933, and utilizes the numeric values inserted in the block 919 of FIG. 14a, which define the position of the loader device 5 and of the discharge table with respect to the press 1.

In particular, this block 933 conveniently adds to the beginning and to the end of the sequence created in the block 902, the sequence of command signals respectively defined with the blocks from 300 to 312 and from 410 to 412 in FIGS. 10a and 10b. Finally, from the block 938 it goes to the block 937 which acts to record in the memory of the electronic unit 7a, and possibly on a magnetic recording medium, the sequence of command signals created for a complete metal sheet bending cycle, and to associate to this an identifying name conveniently defined with the keyboard 8a.

Figure 14C:
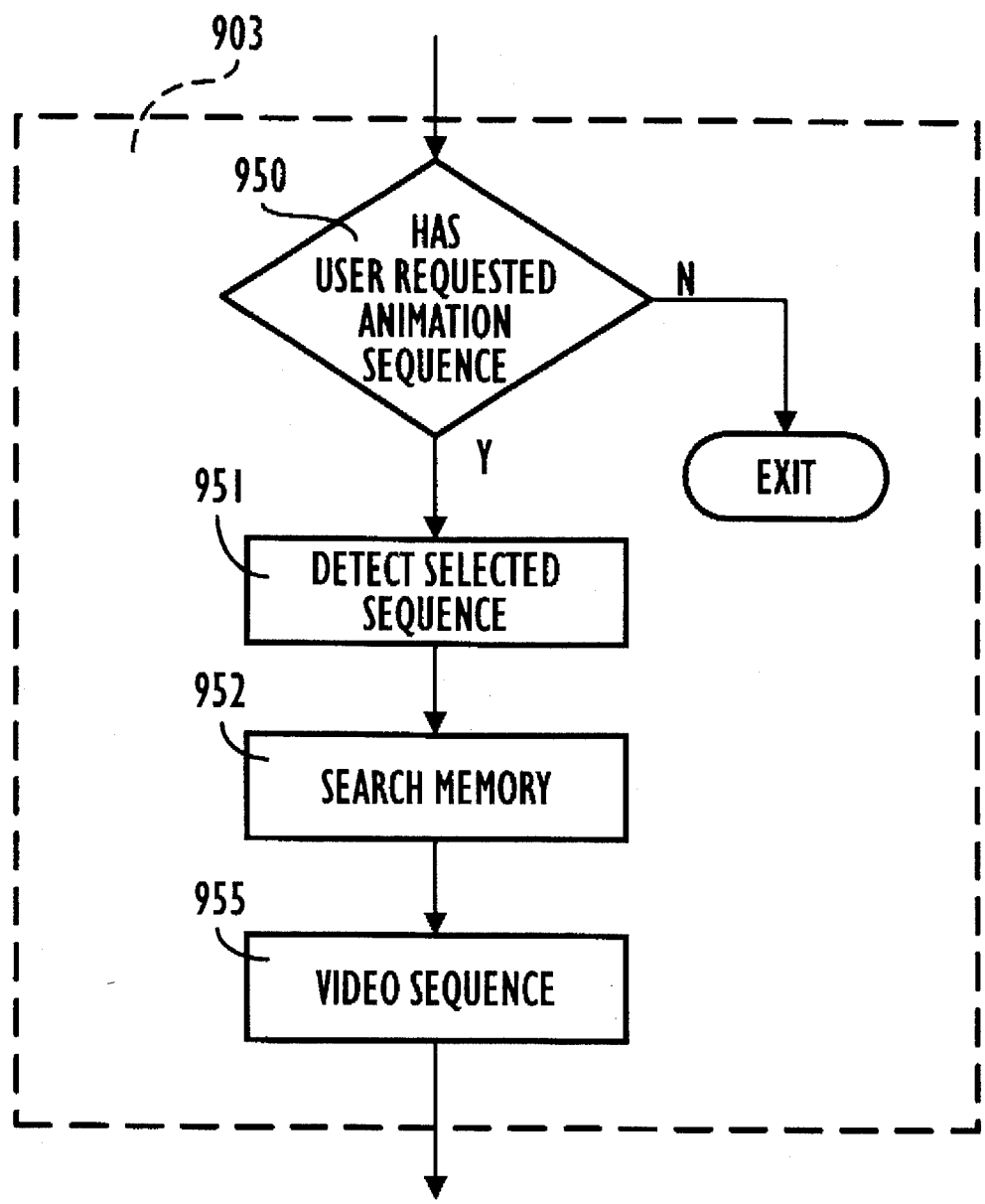

The block 903 of FIG. 13 is illustrated in detail in FIG. 14c. In particular, the block 903 includes the first block 950 which detects if the user has requested, by means of a key 980 of the keyboard 8a, to see the animation of a sequence of signals commanding the movement of the installation 500 for a previously created cycle memorized by the block 902. In the negative case, from the block 950 it exits from the program, and in the positive case it goes to the block 951 which detects the selection, by means of the keyboard 8a, of the name of the previously created sequence of signals memorized with the block 902, and defined with the block 937. After this name has been selected, it goes from the block 951 to a block 952 which searches in the memory of the unit 7a or on the magnetic recording medium for the sequence of command signals indicated by the said name.

Finally, from the block 952 it goes to the block 955 which acts to represent in succession on the video 9a for the sequence of command signals of this selected cycle, the corresponding dispositions and movements of the parts of the bending installation 500.

In this way the rapid succession of a sequence of consecutive images suitably spaces in time permits the operator to be given an animation of the complete bending cycle with a sufficient approximation.

The sequence of command signals created in the electronic unit 7a according to the system of the present invention can then be transferred into the electronic unit 7 of the bending installation 500 in direct manner (for example by the connection cable 780) or in an indirect manner (for example with the transposition of elements carrying memorized information) where, with reference to FIG. 9, it can be put into operation with the block 271, for example for producing the profile illustrated in FIG. 7.

This sequence of control signals, before being sent to the block 271, can be speeded up, for example according to the system described in an Italian Patent Application filed 18 Dec. 1989 and entitled "A System for Increasing the Working Speed of a Sequence of Command and Control Signals for a Robot Manipulator Device of a Metal Sheet Bending Installation" and can be automatically adapted for installations similar to the specific installation on which the basic control signals have been created, for example according to the system described in an Italian Patent Application filed 18 Dec. 1989 and entitled "A System for Dimensional Checking of the Configuration of a Robot Manipulator Device in a Metal Sheet Bending Installation, and Automatic Adaptation of the Control Signals for the Said Manipulator Device."

Finally, it is clear that modifications and variations can be introduced to the present invention without however departing from the protective scope of the present invention. For example, the representation given on the video of the bending installation 500 can be modified or particularized.

Furthermore the keyboard 8a, and the portion thereof represented on the video 9a can be different.

Likewise, various of the auxiliary functions described for the block 936 of FIG. 14b could also be called up from the Simulation block 903.

The functions associated with the function keys 260 can be different, and can be achieved by means of respective movement keys of the keyboard 8a, or by means of other additional keys controlling movements of specific parts of the installation 500.

The signals for commanding movement of the heads 10 along the X-axis to approach or withdraw from the metal sheet 23, rather than being created with the pair of keys 266, can be automatically defined in association with (before or after) the commands for opening or closure of the pincers 72 or 73.

The flow charts illustrated in the various Figures can be modified and likewise the configuration of the bending installation 500 and of the manipulator device 4 can be varied.

INDUSTRIAL APPLICABILITY

The advantages obtained with the system of the present invention, for the creation of command signals for controlling a metal sheet bending cycle, and for visual representation of the phases of this cycle, are evident from what has been described, since the operator can create or modify these signals in a more rapid, convenient and efficient manner without having to use the bending installation itself, and with the possibility of testing the correctness of the cycle created; moreover, the operator is also helped by the possibility of utilizing the auxiliary functions described. Finally, by means of the system of the present invention the deformation of the metal sheet 23 achieved when it is subjected to a bending cycle can advantageously be displayed in advance.

We claim:

1. A system for creating control signals for a complete operating cycle of a robot manipulator device of a sheet metal bending installation, said system comprising:

communication means for communicating with an operator, said communication means being connected to a central processor unit, said central processor unit producing a video simulation of said robot manipulator device including a video representation of a relative positioning and continuous movements of working parts of said bending installation and of a workpiece, and creating said control signals;

wherein said working parts comprise a pair of dies and a head and pincers of said robot manipulator;

said central processor unit including first means for presenting, by means of said communication means, data relating to said working parts of said sheet metal bending installation and the workpiece;

said central processor unit further including second means operable to permit, by means of said communication means, introduction and/or modification of said data into said central processor unit; and said second means including means operable to permit the introduction and/or modification of said data relating to dimensional information on at least one working part of said bending installation;

said central processor unit further including third means operable to permit the creation and/or modification of control signals for bending cycles;

said third means further comprising means for displaying continuous movements of said video representation of said workpiece and for displaying a video representation of interaction between said workpiece and said working parts, said video representation responsive to said data related to dimensional information.

2. The system according to claim 1, wherein said communication means includes a keyboard and a video display.

3. The system according to claim 1, further comprising means for transferring said control signals from said central processor unit to a control unit of said installation.

4. The system according to claim 1, wherein said data relating to dimensional information comprises information on at least a main gripper member of said manipulator device, a rear position sensor, a pair of dies, a magazine for loading, and a magazine for discharging a metal sheet.

5. The system according to claim 1, wherein said central processor unit further comprises third means operable to command a presentation on a display device of the visual representation which comprises a plurality of working parts of the sheet metal bending installation and the workpiece, the visual representation including both a configuration and a movement of the working parts and the workpiece.

6. A system for creating control signals for a complete operating cycle of a robot manipulator device of a sheet metal bending installation, said system comprising:

communication means for communicating with an operator, said communication means being connected to a central processor unit for producing a video simulation of said robot manipulator device and for creating said control signals, said video simulation including a video representation of a configuration and continuous movements of working parts of said bending installation and of a workpiece;

wherein said working parts comprise a pair of dies and a head and pincers of said robot manipulator;

said central processor unit including first means for presenting, by means of said communication means, data relating to said working parts of said sheet metal bending installation and said workpiece;

said central processor unit further including second means operable to permit, by means of said communication means, introduction and/or modification of said data into said central processor unit;

said second means including means operable to permit the introduction and/or modification of said data relating to dimensional information on said workpiece which is to be bent;

said central processor unit further including third means operable to permit the creation and/or modification of control signals for bending cycles; and said third means further comprising means for displaying a continuous real-time video representation of said operating cycle, said means for displaying include means for imparting movement to said video representation of said working parts corresponding to said control signals, wherein said video representation of the working parts contact said video representation of the workpiece, and said means for displaying further including means for bending said video representation of said workpiece in accordance with said data relating to dimensional information.

7. A system for creating control signals for a complete operating cycle of a robot manipulator device of a sheet metal bending installation, said system comprising:

communication means for communicating with an operator, said communication means being connected to a central processor unit for producing a video simulation of said robot manipulator device and for creating said control signals, said video simulation including a video representation of a configuration and continuous movements of working parts of said bending installation and of a workpiece;

wherein said working parts comprise a pair of dies and a head and pincers of said robot manipulator;

said central processor unit including first means for presenting, by means of said communication means, data relating to said working parts of said sheet metal bending installation and said workpiece;

said central processor unit further including second means operable to permit, by means of said communication means, introduction and/or modification of said data into said central processor unit;

said second means including means operable to permit the introduction and/or modification of said data relating to dimensional information on bends which are to be formed on said workpiece;

said central processor unit further including third means operable to permit the creation and/or modification of control signals for bending cycles; and said third means further includes display means for displaying movement of and interaction between said video representation of said workpiece and said video representation of said working parts and for movement of said video representation of said working parts in contacting and bending said video representation of said workpiece.

8. A system for creating control signals for a complete operating cycle of a robot manipulator device of a sheet metal bending installation, said system comprising:

communication means for communicating with an operator, said communication means being connected to a central processor unit for producing a working simulation of said robot manipulator device and for creating said control signals, said working simulation including a visual representation of a configuration and continuous movements of working parts of said bending installation and of a workpiece;

wherein said working parts comprise a pair of dies and a head and pincers of said robot manipulator;

said central processor unit including first means for presenting, by means of said communication means, data relating to working parts of said sheet metal bending installation and said workpiece;

said central processor unit further including second means operable to permit, by means of said communication means, introduction and/or modification of said data into said central processor unit; and said second means being operable to command presentation, by said communication means, of a configuration of at least one of said working parts of said sheet metal bending installation and of said workpiece.

9. A system for creating control signals for a complete operating cycle of a robot manipulator device of a sheet metal bending installation, said system comprising:

communication means for communicating with an operator, said communication means being connected to a central processor unit for producing a working simulation of said robot manipulator device and for creating said control signals, said working simulation including a visual representation of a configuration and continuous movements of working parts of said bending installation and of a workpiece;

wherein said working parts comprise a pair of dies and a head and pincers of said robot manipulator;

said central processor unit including third means operable to permit, by said communication means, creation and/or modification of said control signals for said operating cycle in said central processor unit; and said third means including means operable to permit creation and/or modification of said control signals for controlling phases of said operating cycle.

10. The system according to claim 9, wherein said means operable to permit creation and/or modification of said control signals for controlling phases of said operating cycle are activated by elements in said communication means for commanding movement of working parts of said installation.

11. The system according to claim 9, wherein said means operable to permit creation and/or modification of said control signals for controlling phases of said operating cycle are activated by elements in said communication means selectable by an operator and operable to create a complete sequence of said signals for controlling the phases.

12. The system according to claim 9, wherein said means operable to permit creation and/or modification of said control signals for controlling the phases of said operating cycle act to command presentation, by said communication means, of a configuration of working parts of said installation, and a workpiece of predetermined form, relating to a phase selected for the creation and/or modification of said control signals.

13. The system according to claim 12, wherein said means operable to permit creation and/or modification of said control signals for controlling phases of said operating cycle act to command the presentation, by said communication means, of the configuration of said working parts of said installation and said workpiece of predetermined form, relating to bending phases preceding and following the selected phase.

14. A system for creating control signals for a complete operating cycle of a robot manipulator device of a sheet metal bending installation, said system comprising:

communication means for communicating with an operator, said communication means being connected to a central processor unit for producing a working simulation of said robot manipulator device and for creating said control signals;

said central processor unit including third means operable to permit, by said communication means, creation and/or modification of said control signals for said operating cycle in said central processor unit; and said third means including means operable to command a visual presentation, by said communication means, of a configuration of working parts of the installation and elements of said communication means, operable to permit creation and/or modification of said control signals for controlling phases of the operating cycle;

wherein said working parts comprise the pair of dies and the head and pincers of said robot manipulator.

15. A system for creating control signals for a complete operating cycle of a robot manipulator device of a sheet metal bending installation, said system comprising:

communication means for communicating with an operator, said communication means being connected to a central processor unit for producing a working simulation of said robot manipulator device and for creating said control signals;

said central processor unit including third means operable to permit, by said communication means, creation and/or modification of said control signals for said operating cycle in said central processor unit;

said third means including means operable to define control signals for a phase of withdrawing a metal sheet workpiece from a magazine for loading of said installation by means of said manipulator device, means operable to define control signals for an execution of bending phases of said operating cycle on said workpiece in dependence on data introduced by said communication means, and means operable to define control signals for controlling a phase of discharging said workpiece onto a magazine for discharging from said installation, said means operable to define control signals for an execution of bending phases on said workpiece being adapted to define insertion of one side of said workpiece between a pair of dies of the installation, detection of positioning of said one side between said pair of dies by a pair of sensors located to the rear of said dies, movement of said pair of dies to form a bend, extraction of said one side of a bent workpiece from a region of said dies, and displacement of a head of said manipulator device to present the workpiece between said pair of dies in a position corresponding to forming of a subsequent bend.

16. A system for creating control signals for a complete operating cycle of a robot manipulator device of a sheet metal bending installation, said system comprising:

communication means for communicating with an operator, said communication means being connected to a central processor unit for producing a working simulation of said robot manipulator device and for creating said control signals, said working simulation including a visual representation of a configuration and continuous movements of working parts of said bending installation and of a workpiece;

wherein said working parts comprise a pair of dies and a head and pincers of said robot manipulator;

said central processor unit including third means operable to permit, by said communication means, creation and/or modification of said control signals for said operating cycle in said central processor unit; and said central processor unit including fourth means operable to command a presentation by said communication means of a configuration of working parts of said installation, an initial form of said workpiece which is to be bent, and successive bending phases of said operating cycle to achieve a desired object in dependence on said control signals determined by said third means.

17. A system for creating control signals for a complete operating cycle of a robot manipulator device of a sheet metal bending installation, said system comprising:

communication means for communicating with an operator, said communication means being connected to a central processor unit for producing a video simulation of said robot manipulator device and for creating said control signals, said video simulation including a video representation of a configuration and continuous movements of working parts of said bending installation and of a workpiece;

wherein said working parts comprise a pair of dies and a head and pincers of said robot manipulator;

said central processor unit including third means operable to permit, by said communication means, creation and/or modification of said control signals for said operating cycle in said central processor unit;

said third means including means adapted to define functions for said control signals defined by said third means operable to permit creation and/or modification of said control signals for controlling phases of said operating cycle; and said communication means further comprising means for displaying a continuous real-time video representation of said bending program including a video representation of said working parts in motions corresponding to said control signals, wherein said video representation of working parts contact said video representation of the workpiece, and said display means further include means for bending said video representation of said workpiece in a manner consistent with said control signals.

18. The system according to claim 17, said means adapted to define functions for said control signals comprising means acting automatically to determine a preferable grip position of a metal sheet by said manipulator device.

19. The system according to claim 17, said means adapted to define functions for said control signals including means, acting respectively to activate or deactivate a detection, with automatic indication of possible interference in movement of working parts of said installation and a metal sheet.

20. The system according to claim 17, said means adapted to define functions for said control signals including means acting to modify a dimensional scale of presentation by said communication means of a configuration of working parts of said installation and a metal sheet.

21. The system according to claim 17, said means adapted to define functions for said control signals including means acting to modify a sequence of presentation by said communication means of a configuration of working parts of said installation, said manipulator device, and a metal sheet, created by means of said third means.

22. A system for creating control signals for an operating cycle of a sheet metal bending installation that has working parts including a bending press and a robot manipulator; wherein said working parts comprise a pair of dies and a head and pincers of said robot manipulator; the bending press having a pair of dies relatively movable toward and away from each other for bending a sheet metal workpiece disposed between the pair of dies, the robot manipulator having a head movable in three-dimensional space and a pair of pincers provided on the head, the system comprising:

a display device;

an input device for inputting parameters concerning the bending press, the robot manipulator and the sheet metal workpiece, the parameters including shapes and dimensions of the dies, dimensions of the sheet metal workpiece, and dimensions of the pincers, the input device further being adapted to input instructions for moving the pair of dies of the press, the head, and the pincers of the robot manipulator;

a central processor unit including means operable to command a presentation on said display device, of the relative configuration of a plurality of working parts of the installation and of the sheet metal workpiece in accordance with said parameters that are input through said input device, said presentation command means being further operable to command a presentation on said display device of continuous movements of said plurality of working parts of the installation in accordance with the instructions input through said input device.

23. The system according to claim 22, wherein said presentation command means include means for detecting possible interference in movement of said plurality of working parts of the installation.

24. The system according to claim 22, wherein the installation comprises two robot manipulators.

25. A system for creating control signals for an operating cycle of a robot manipulator device of a sheet metal bending installation, said system comprising:

a display unit;

a central processor unit connected to said display unit;

said central processor unit permitting creation and/or modification of said control signals for said operating cycle;

said central processor unit producing a first set of signals for controlling said robot manipulator in a number of stages of said operating cycle and producing a second set of signals for presenting, on said display unit, a visual representation of a configuration and movement of working parts of said robot manipulator device and of a workpiece based on said first set of signals; and said central processor unit further producing an alarm signal when interference occurs between at least two of said robot manipulator device, said working parts, and said workpiece.

26. A system according to claim 25, said alarm signal comprising an acoustic tone.

27. A system for creating control signals for an operating cycle of a robot manipulator device of a sheet metal bending installation, said system comprising:

a display unit;

a central processor unit connected to said display unit;

said central processor unit permitting the creation and/or modification of said control signals for said operating cycle;

said central processor unit producing a first set of signals for controlling said robot manipulator in a number of stages of said operating cycle and producing a second set of signals for presenting, on said display unit, a visual representation of a configuration and movement of working parts of said robot manipulator device and of a workpiece based on said first set of signals; and said central processor unit further producing an aid signal for showing a preferable grip position on said workpiece by said robot manipulator device.

28. A system for creating control signals for an operating cycle of a robot manipulator device of a sheet metal bending installation, said system comprising:

a display unit;

a central processor unit connected to said display unit;

said central processor unit producing a first set of signals for controlling said robot manipulator in a number of stages of said operating cycle and producing a second set of signals for presenting, on said display unit, a visual representation of a configuration and a movement of working parts of said robot manipulator device and of a workpiece based on said first set of signals; and said central processor unit further producing a control signal for enlarging a detail of a portion of said robot manipulator device on said display unit.

29. A method of creating control signals for a complete operating cycle of a sheet metal bending installation that includes a bending press, a robot manipulator device positioned in front of the bending press, a magazine with a loader device and discharge table, and communication means, for communicating with an operator, coupled to a central processing unit, the central processing unit for producing a working simulation of the bending press and the robot manipulator device and creating the control signals, the method comprising the steps of:

(a) displaying a video representation of a cross-section of the bending installation and a sheet metal;

(b) at least one of creating and modifying signals for controlling a bending phase in which bending is performed on the sheet metal by the bending press;

(c) displaying a video representation of movements of the bending press, of the robot manipulator device, and of the sheet metal during the bending phase defined in step (b);

(d) checking whether at least one of the sheet metal and a movable part of the robot manipulator device interferes with a fixed structure of the bending installation; and (e) repeating steps (b), (c), and (d) to create the complete operating cycle, wherein the step of checking for interference of at least one of the sheet metal and the movable part of the robot manipulator device with the fixed structure at step (d) occurs immediately after the signals for controlling the bending phase are created at step (b).

* * * * *